FABRICATION OF ELECTRICAL DEVICES

Filed Sept. 26, 1957 12 Sheets-Sheet 1

INVENTORS
PENROSE R. HOOPES
STUART L. PARSONS
WILLIAM T. SHINN
ROBERT T. VAUGHAN
BY F D Prager
ATTORNEY

FABRICATION OF ELECTRICAL DEVICES

Filed Sept. 26, 1957 12 Sheets-Sheet 2

INVENTORS
PENROSE R. HOOPES
STUART L. PARSONS
WILLIAM T. SHINN
ROBERT T. VAUGHAN
BY
F D Rogers
ATTORNEY March 15, 1960 P. R. HOOPES ET AL 2,928,931

FABRICATION OF ELECTRICAL DEVICES

Filed Sept. 26, 1957 12 Sheets-Sheet 3

INVENTORS
PENROSE R. HOOPES
STUART L. PARSONS
WILLIAM T. SHINN
ROBERT T. VAUGHAN

BY F D [signature]
ATTORNEY

March 15, 1960 P. R. HOOPES ET AL 2,928,931

FABRICATION OF ELECTRICAL DEVICES

Filed Sept. 26, 1957 12 Sheets-Sheet 4

INVENTORS
PENROSE R. HOOPES
STUART L. PARSONS
WILLIAM T. SHINN
ROBERT T. VAUGHAN

BY F D Prager
ATTORNEY

INVENTORS
PENROSE R. HOOPES
STUART L. PARSONS
WILLIAM T. SHINN
ROBERT T. VAUGHAN
BY F D Prager
ATTORNEY

FABRICATION OF ELECTRICAL DEVICES

INVENTORS
PENROSE R. HOOPES
STUART L. PARSONS
WILLIAM T. SHINN
ROBERT T. VAUGHAN

BY F D Prager
ATTORNEY

INVENTORS
PENROSE R. HOOPES
STUART L. PARSONS
WILLIAM T. SHINN
ROBERT T. VAUGHAN

BY F D Prager
ATTORNEY

INVENTORS
PENROSE R. HOOPES
STUART L. PARSONS
WILLIAM T. SHINN
ROBERT T. VAUGHAN

BY F D Prager
ATTORNEY

FABRICATION OF ELECTRICAL DEVICES

Filed Sept. 26, 1957 12 Sheets-Sheet 9

INVENTORS
PENROSE R. HOOPES
STUART L. PARSONS
WILLIAM T. SHINN
ROBERT T. VAUGHAN
BY
F D Prager
ATTORNEY INVENTORS
PENROSE R. HOOPES
STUART L. PARSONS
WILLIAM T. SHINN
ROBERT T. VAUGHAN
BY F. D. Prager
ATTORNEY March 15, 1960 P. R. HOOPES ET AL 2,928,931

FABRICATION OF ELECTRICAL DEVICES

Filed Sept. 26, 1957 12 Sheets-Sheet 11

INVENTORS
PENROSE R. HOOPES
STUART L. PARSONS
WILLIAM T. SHINN
ROBERT T. VAUGHAN
BY
F D Prager
ATTORNEY March 15, 1960 P. R. HOOPES ET AL 2,928,931

FABRICATION OF ELECTRICAL DEVICES

Filed Sept. 26, 1957 12 Sheets-Sheet 12

INVENTORS
PENROSE R. HOOPES
STUART L. PARSONS
WILLIAM T. SHINN
ROBERT T. VAUGHAN

BY F D Prager
ATTORNEY

United States Patent Office 2,928,931

Patented Mar. 15, 1960

2,928,931

FABRICATION OF ELECTRICAL DEVICES

Penrose R. Hoopes, Philadelphia, William T. Shinn, Lansdale, Robert T. Vaughan, Cheltenham, and Stuart L. Parsons, Gwynedd Valley, Pa., assignors to Philco Corporation, Philadelphia, Pa., a corporation of Pennsylvania Application September 26, 1957, Serial No. 690,595

(Filed under Rule 47(a) and 35 U.S.C. 116)

20 Claims. (Cl. 219—85)

This invention relates to a method of and apparatus for fabricating transistors and the like. The invention will be described particularly as embodied in a machine for attaching "whisker" wires to semiconductor blanks of the surface barrier type, but it is capable of many other, related applications.

A primary object of the invention is to provide a compound micro-manipulator device of high precision and versatility. The device must perform multiple operations of difficult character, including for instance the centering of transistor electrodes relative to whisker wires much thinner than a human hair and, after such centering, the establishment of controlled pressure by the thin wire against even thinner laminae of semiconductor material. The invention provides for the successive performance of several such and similar high-precision operations in a single work area, under full automatic control telescopically and automatically guided at certain stages and subject to optional, manual supervision or guidance. It represents more than a mere mechanized substitute for or equivalent of human operators, skilled in the methods of transistor manufacture. The device is capable of performance which goes far beyond the abilities of any person, aided by the best tools and instruments. It opens new, important avenues of productive work.

Another objective, of almost equal importance, is to enhance the speed of fabricating operations of the present type. Again, comparison with the work of human technicians may be of interest. Not only does the invention eliminate numerous preparatory operations hitherto required, such as picking up small parts, bringing them into the sight of a microscope or the like and placing them in the proper, basic relation to one another for the final adjustments and arrangements, it also minimizes such time losses as are incurred in conventional automatic machinery, which are traceable for instance to the use of transfer operations between different fabricating stages. By contrast, according to the present invention, a complex cycle of fabricating operations is performed in a single stage or work area of minute size, where micro-manipulations, in rapid succession, are applied to the whisker wire and the transistor blank. Such manipulations involve controlled movements over distances visible only under strong magnification, and feeler operations far beyond the sensitivity of human fingers or even of conventional precision instruments. At the same time, preparatory set-up operations as well as transfer steps are minimized. While only seconds or micro-seconds are involved in most of the operations or steps performed, the numbers of such steps and operations, involved in each fabricating cycle, are very high. In addition, the demand for the semiconductors is heavy; thus the saving of time, achieved by the invention, greatly reduces the costs of those of the ultimate products which could also be made by other means or methods.

Seen or considered as a method, a preferred embodiment of the present invention is characterized by the feature that a whisker wire is fed from a zone of continuous supply, for instance from a reel, directly into the work area, where a plurality of steps are then performed on the end of such wire, prior to attachment of the wire to a stem lead or the like. For instance, a system of sharply defined coordinates, corresponding to the three dimensions of space, is firmly and securely established, by means including certain optical apparatus, and the forward end of the whisker wire material is fed toward the intersection of said coordinates. A sequence of gripping, cutting, plating, orienting, contacting, heating, soldering and/or other operations are then performed, generally on the wire, to bring the wire into substantially perfect position and condition, in said intersection, while the transistor electrode to be connected with the wire is similarly positioned. These gripping, cutting and related operations are performed so as not only to allow a variety of movements of the wire and of the transistor, but additionally to avoid interference between the different manipulator tools and moreover to minimize the time required for the entire operating cycle. After all this, the free end of the wire is attached to a stem lead.

Additional features and characteristics of the new method will best be considered in connection with the operations of certain parts of the preferred apparatus. Accordingly such apparatus will now be described.

Figure 9:
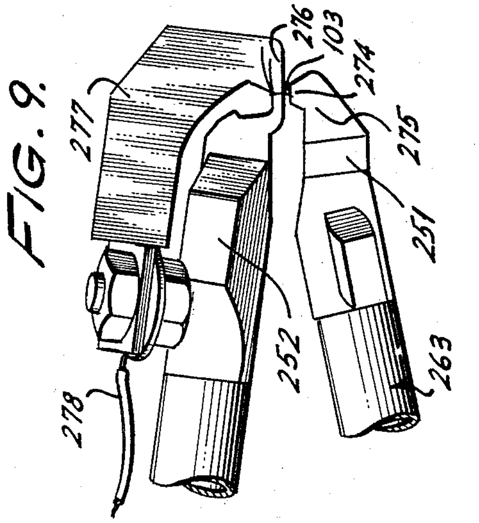
Figure 7:
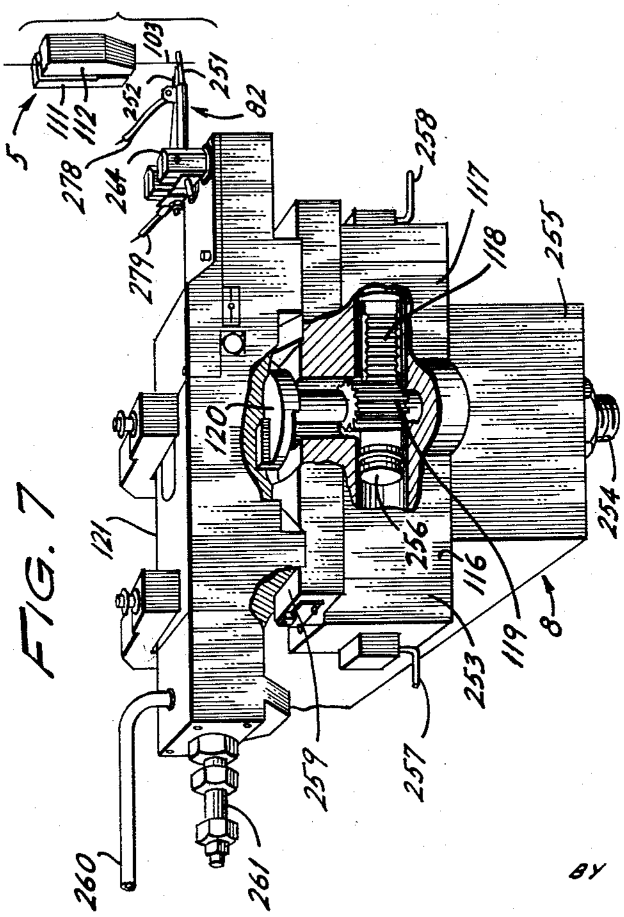
Figure 8:
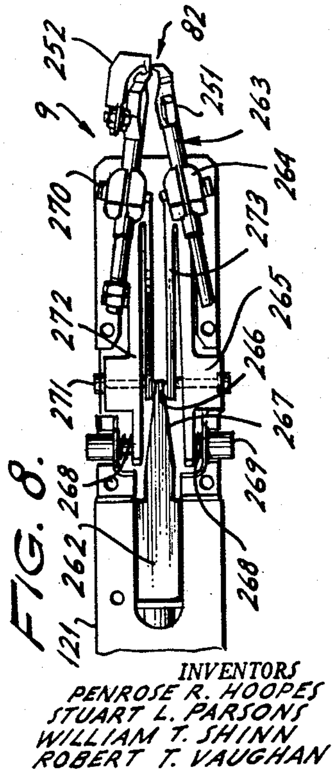

Figure 7 is a perspective view of a wire gripping subassembly, with certain parts broken away in order to disclose other parts. Figure 8 is a plan view of a portion of said wire gripping subassembly, with a cover plate removed therefrom, said portion being designated in Figures 3 and 4 by number 8. Figure 9 is a substantially enlarged plan view of a portion from Figure 8, designated in that figure by the number 9.

Figures 3, 45:
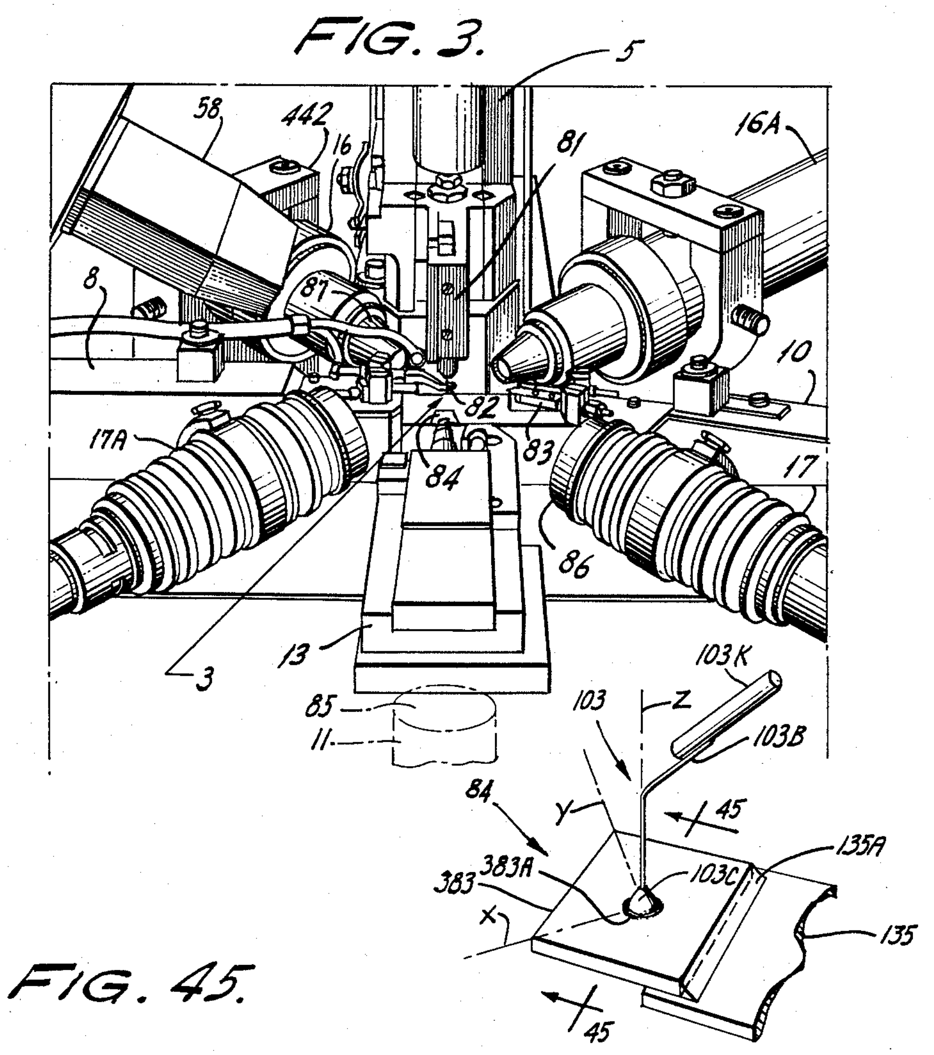
Figure 3 is a fragmentary, perspective front view, on a larger scale, showing the principal work area of said embodiment.
Figure 4:
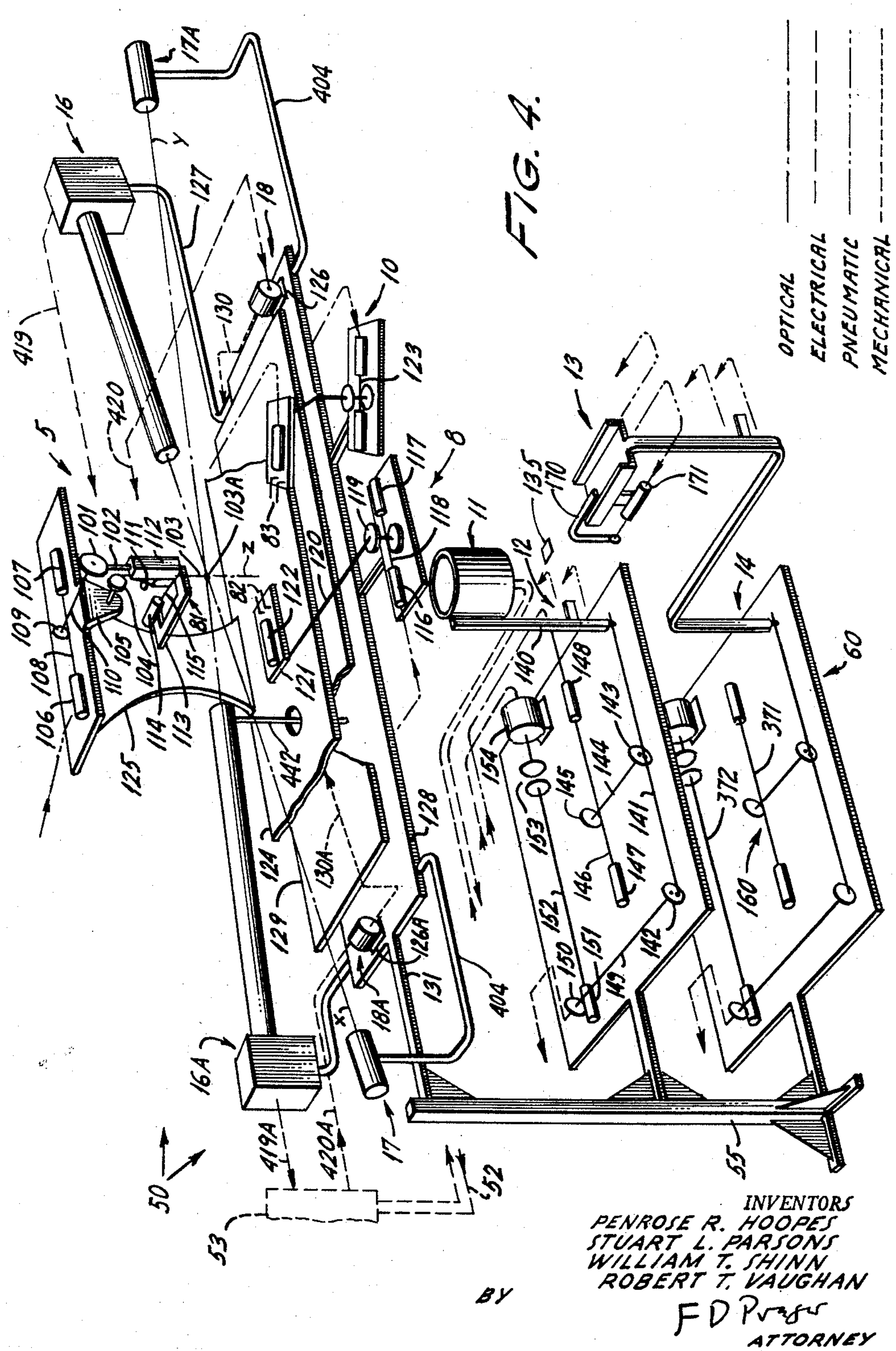
Figure 4 is a schematic, perspective view of the complete machine.
Figure 10:
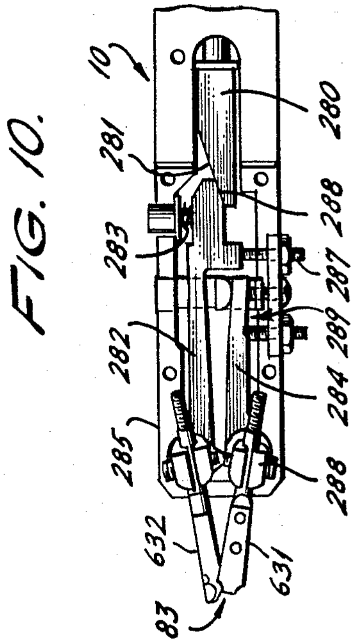

Figure 10 is a view similar to that of Figure 8, showing a portion of a wire cutting and bending subassembly, designated by the numeral 10 in Figures 3 and 4.

Figures 11, 12:
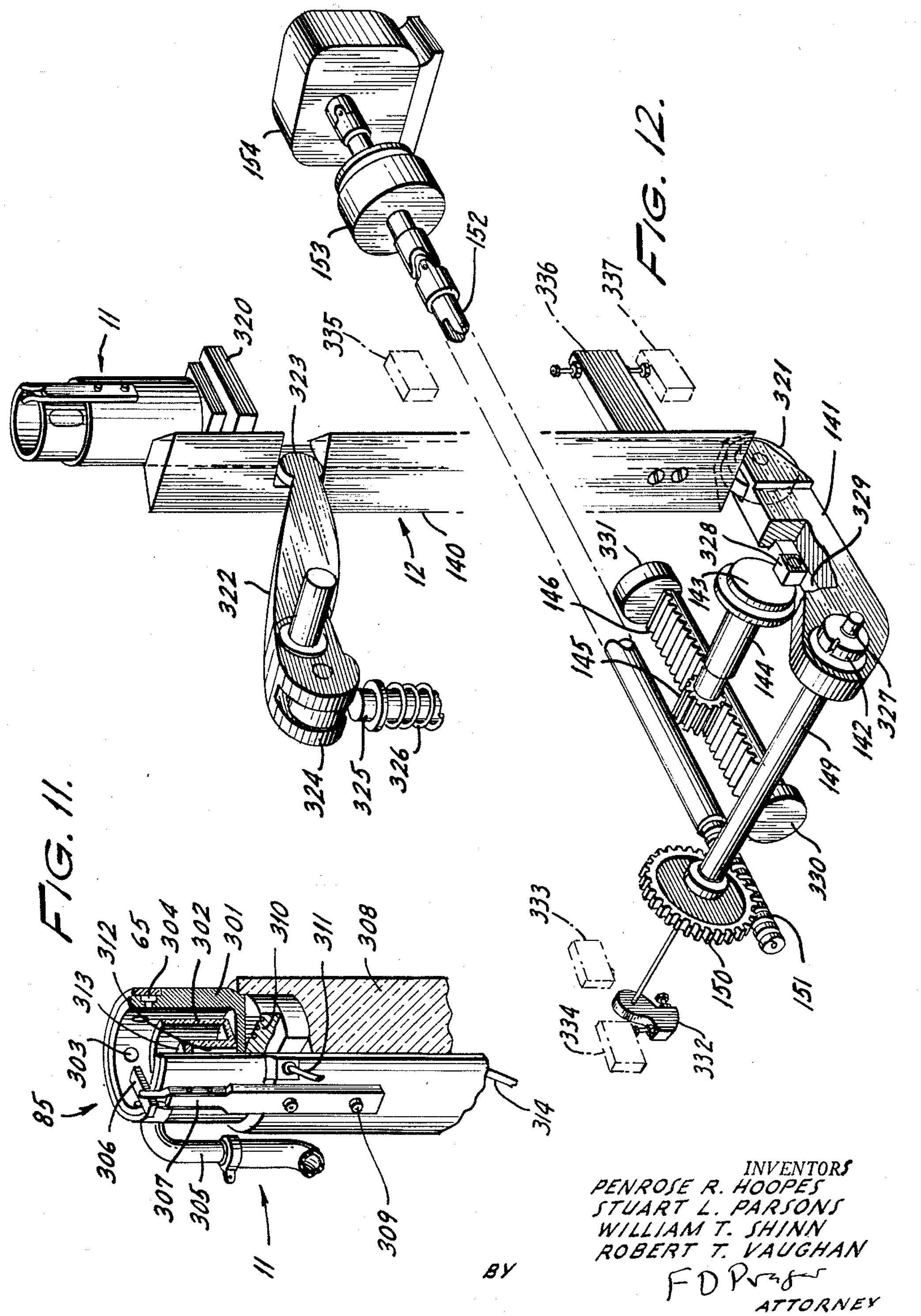

Figure 11 is an enlarged and partly broken away view of a wire plating subassembly 11 from Figure 4. Figure 12 shows the plating subassembly 11 together with supporting and motion control equipment for the same, the latter equipment being indicated in Figures 1 and 4 at 12.

Figure 1:
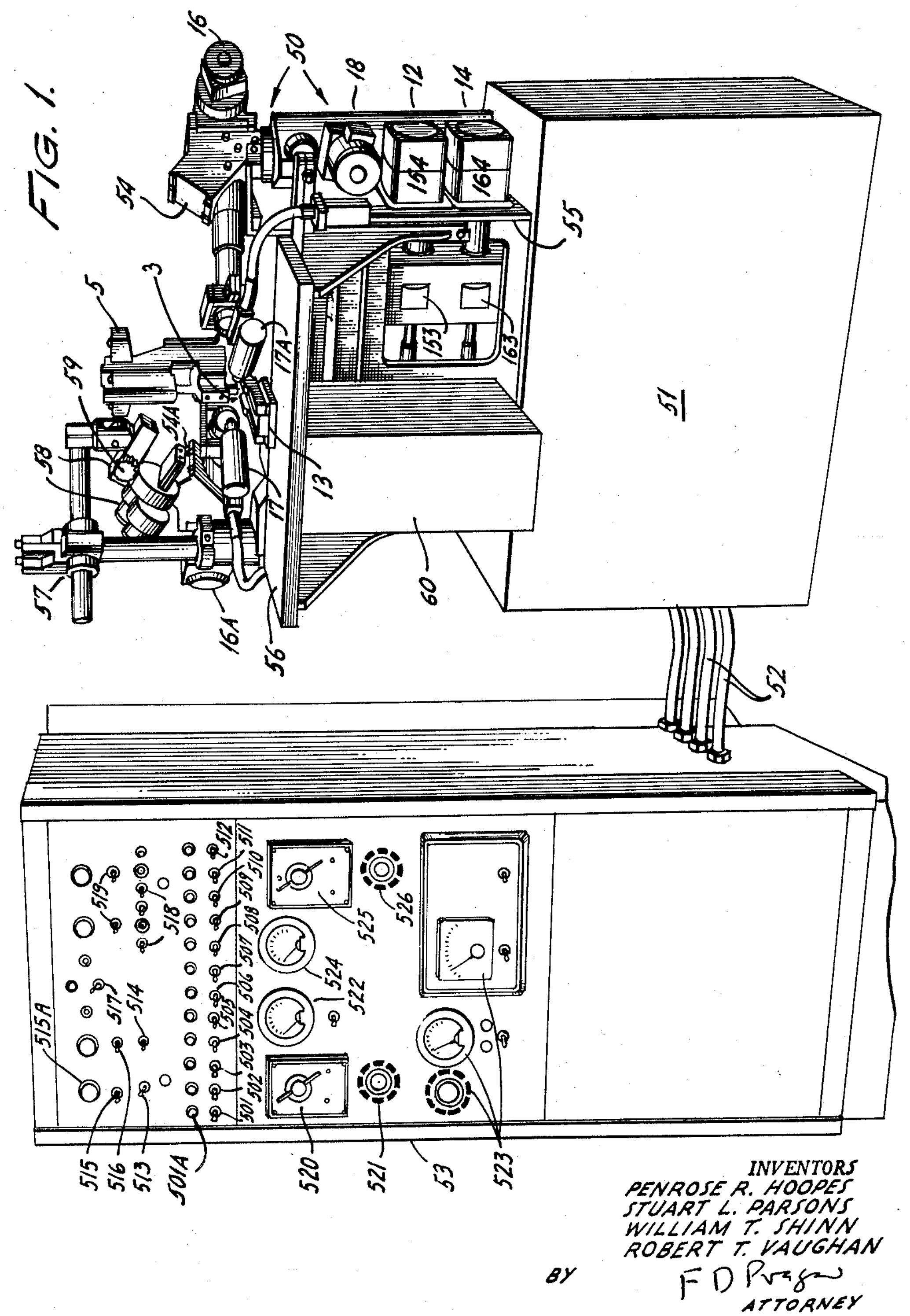
Figure 1 is a complete, perspective front view of a preferred embodiment of the invention.
Figures 13, 14, 15:
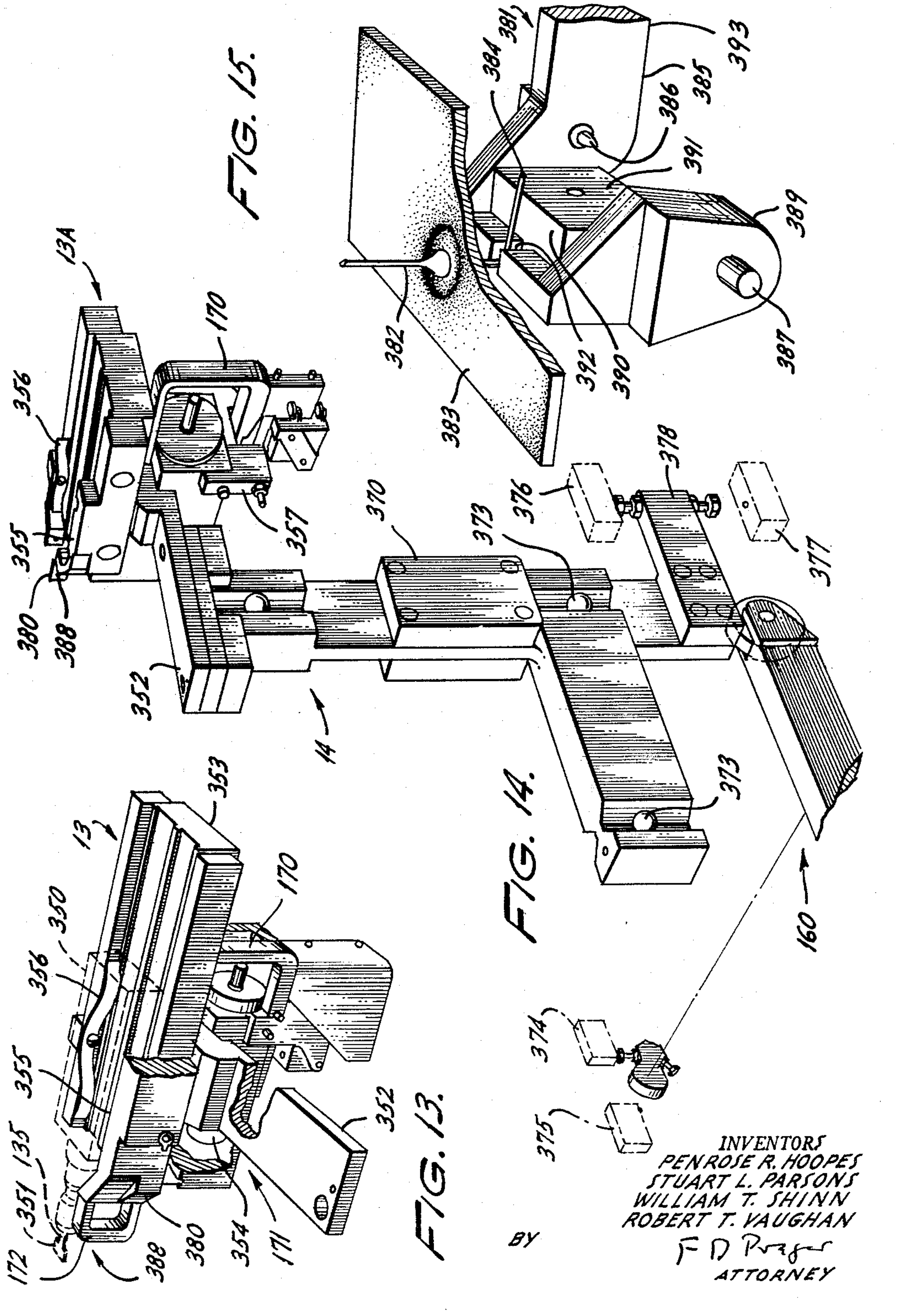

Figure 13 is a perspective view of a fixture device, element 13 in Figures 1, 3 and 4, with parts broken away. Figure 14 is a similar view of a portion of the supporting and motion control mechanism for fixture device 13, this mechanism being indicated at 14 in Figures 1 and 4. Figure 15 is a similar but enlarged view of an attachment of the device 13.

Figures 16, 17:
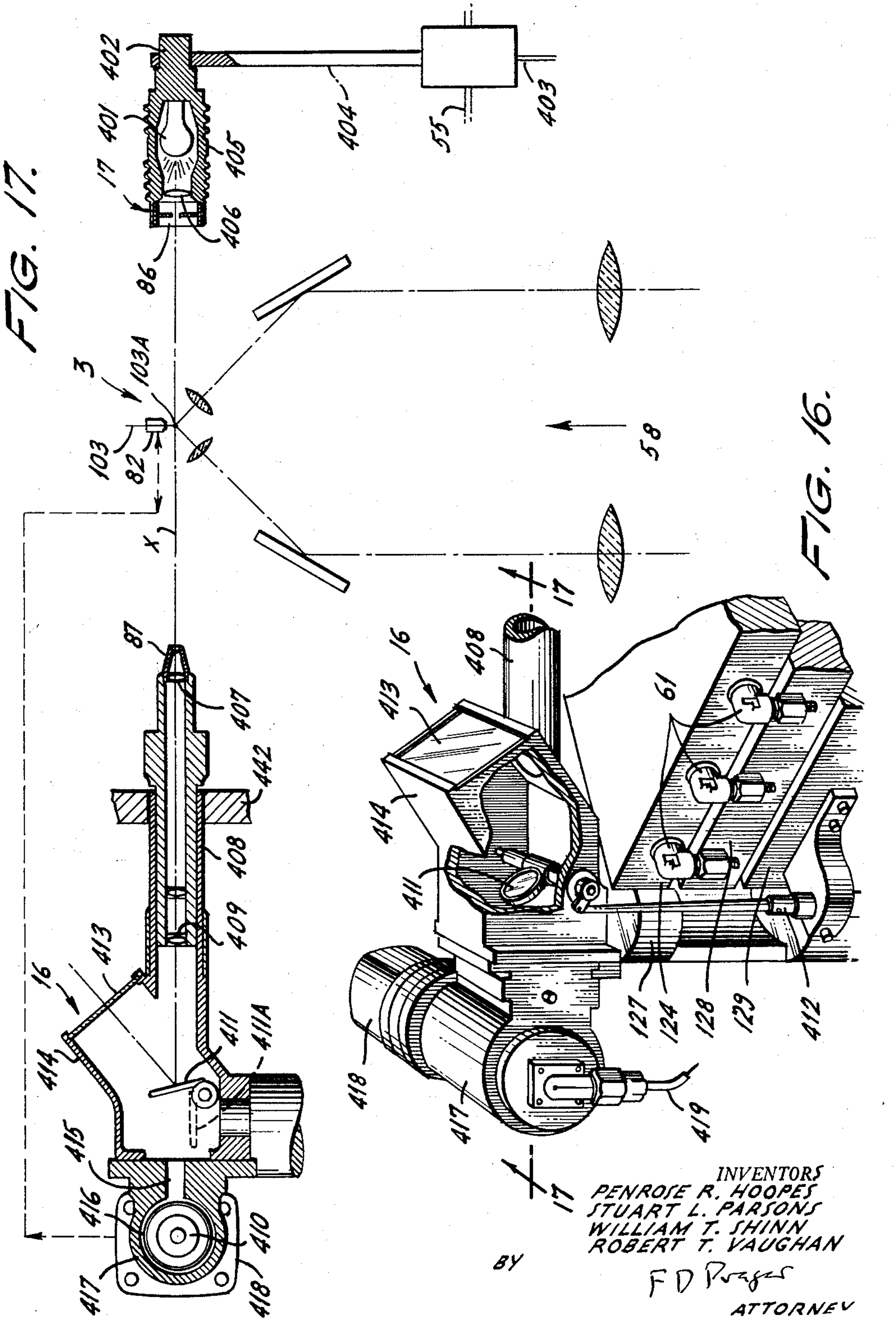

Figure 16 is a perspective view of an optical control subassembly 16 from Figures 1, 2, 3 and 4, with parts broken away, the view being taken from the rear of Figure 1. Figure 17 is a sectional view taken along line 17—17 in Figure 16, also showing an illuminating apparatus, part 17 of Figures 3 and 4.

Figures 18, 19:
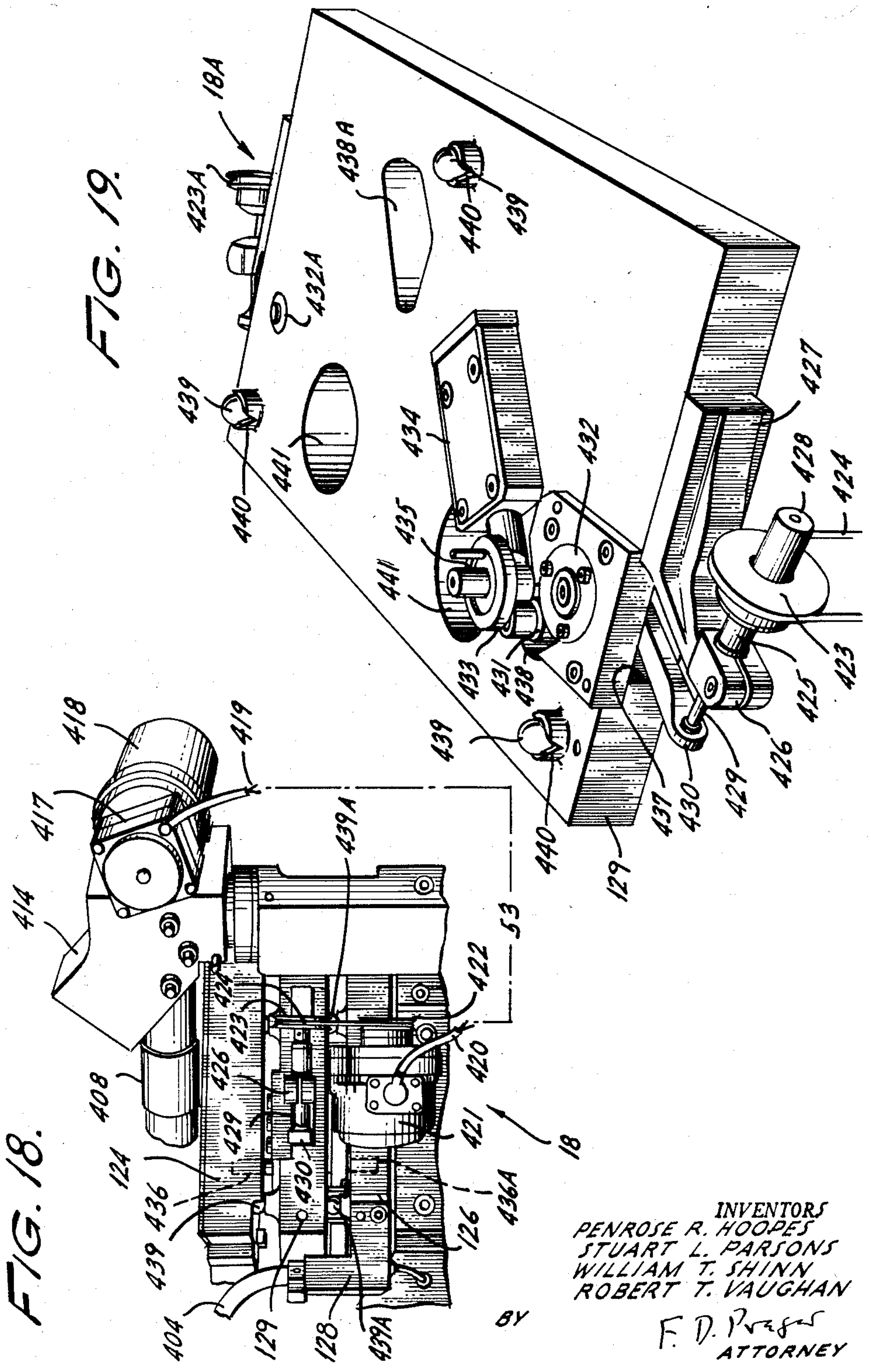
Figure 23:
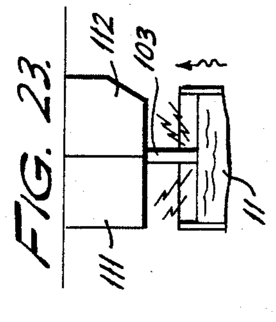

Figure 18 is a perspective view of a servomotor subassembly, part 18 in Figures 1 and 4, seen from the right in Figure 1. Figure 19 is a view, on a scale slightly larger than that of Figure 18, of a portion isolated from that figure, other parts of that figure being removed and the view being taken from a more elevated and laterally shifted viewpoint.

Figures 20 to 43 are views indicating consecutive positions of parts in the center of the work area of Figure 3, said parts being shown in the approximate way in which they may be seen in certain portions of optical subassembly 16.

Figure 44:
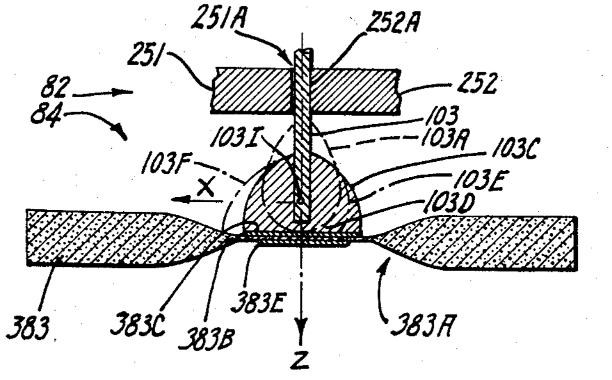

Figure 44 is an enlarged, perspective view of a transistor fabricated by the present apparatus. Figure 45 is a more enlarged section, taken along line 45—45 in Figure 44.

For general orientation, reference is made initially to Figure 1. As shown in this figure, a micro-manipulator unit 50 is installed on a support 51 and connected by cables 52 with a control cabinet 53. The mechanism 50 serves to fabricate transistors (such as that of Figures 44, 45) from semiconductor blank units and from thin whisker wire. A blank unit, to be converted into a complete transistor, is held on a fixture 13 visible in front of Figure 1 and forming part of manipulator unit 50, while whisker wire material—usually much thinner than human hair and invisible in this figure—is stored in a wire feed subassembly 5 of said unit.

Figure 1 also shows that the whisker feed or supply mechanism 5 and semiconductor fixture 13, together with optical control subassemblies 16, 16A and other instruments, are directly or indirectly mounted on a frame 55, forming part of unit 50. A front portion of this frame may be equipped with a board 56 adapted to support semiconductor blanks or carriers thereof, before and after the insertion thereof in the unit 50. The frame 55 may support also the mounting structure 57 of a binocular microscope 58, for the operator's observation of certain elements and operations, for instance during the initial calibration and adjustment of certain parts to be described hereinafter. The structure 57 and microscope 58 may have conventional adjustment means 59, which need not be described in detail.

Figure 2:
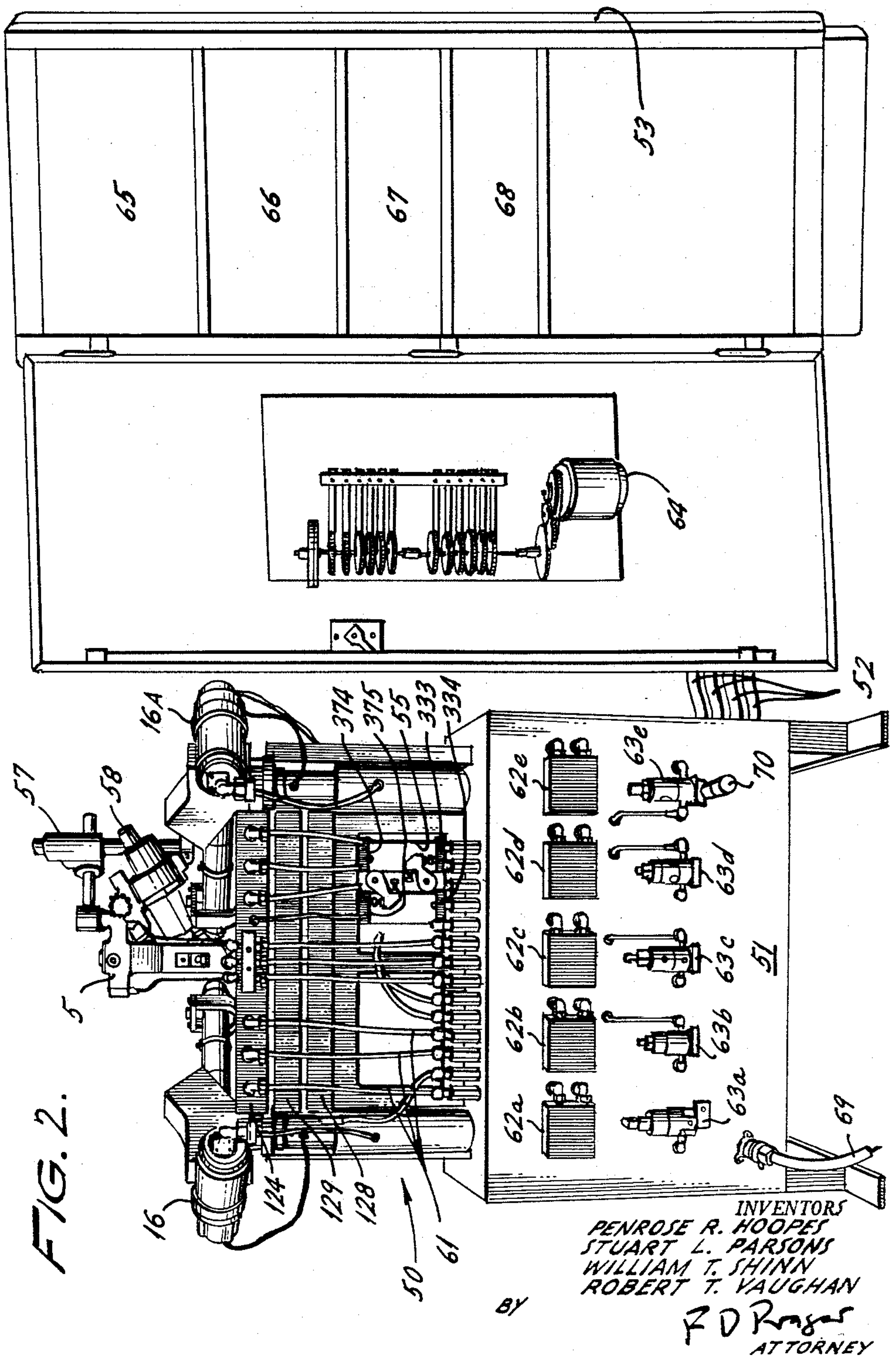
Figure 2 is a similar view showing the back of the same embodiment.

Several of the parts mentioned up to this point are visible not only from the front of the machine (Figure 1), but also from the back thereof, Figure 2. Additionally the back of the frame 55 has a system of pneumatic tubes 61 mounted thereon, connecting a system of solenoid valves 62, 63, on the back of support 51, with pneumatic elements in the system of micromanipulators 5, 13, etc. The solenoid valves in turn are electrically operated, under the control of circuit elements housed in the cabinet 53, which in this figure appears at right and which includes particularly an automatic program control unit 64; interlocking controls 65 for manual or automatic operation; plating and soldering controls 66, 67 for use at certain stages of the preferred operation: and servo controls 68 for use at another important stage of said operation. Pneumatic energy may be generated, stored and controlled by conventional means, not shown, in base 51 (shown at left), while electrical energy may be provided by conventional supply means 69. Spent air from the pneumatic system is exhausted at 70.

The essential operations of the machine are performed behind the board 56 (Figure 1), in a work area adjacent the lower end of the whisker wire supply unit 5 and the forward end of the semiconductor support fixture 13. As may best be noted from Figure 3, the so-identified area, 3, is not only small but is closely surrounded by a plurality of parts or instruments, including among several others the devices 5, 13, 16, which have already been mentioned. These surrounding instruments serve as cooperating micro-manipulators and automatic telescopic control means. More particularly, the following basic manipulating and controlling means are provided: a wire feed element 81 forming part of the wire supply unit 5; wire gripping jaws 82 on the gripping control unit 8; wire cutting and bending jaws 83 on the cut-off unit 10; the gripping and cutting jaws 82, 83 have compound translatory and pivotal motions, in horizontal planes, adjacent the lower end of the wire feed element 81, while the latter has compound vertical and horizontal motions, as will be explained hereinafter. In the direct vicinity of the elements 81, 82, 83 and in accurate register therewith, the semiconductor holding end 84 of a suitable carrier on the fixture 13 can be horizontally inserted, closely below the gripping jaws 82. It is however preferred prior to such insertion to move the top 85 of a tank unit 11 upwardly into the work area 3, for plating a connector bead onto the wire, and then to withdraw said tank downwardly. Still further the work area contains two front lens units 86, forming part of illuminating devices 17, 17A and, aligned therewith, two similar units 87 of telescope and photosensitive devices 16, 16A. These optical elements 86, 87, etc. are focused on the minute whisker end, which is still invisible in the enlarged Figure 3 and which must be attached to an equally minute transistor part. For this purpose said elements provide automatic supervision of certain principal phases of the operation of the machine. The supervision serves particularly to keep certain parts and devices, which so to say converge in the work area 3, in accurate register with one another, while allowing and governing certain small, controlled motions of some such devices or groups of devices, relative to others in said area, to compensate for unavoidable deflections, strain movements and the like, which affect the positions of whisker wires and similar parts.

The said motions occurring in the central or work area 3 of the machine comprise principally the following: downward-upward motions of wire feed element 81; horizontal translatory and pivotal motions of the grip jaws 82 below said element; similar motions of the cutting and bending jaws 83 between elements 81, 82; minute, joint, horizontal motions of the entire group of subassemblies 81, 82, 83, relative to the optical system 86, 87 and the semiconductor on holder 84, in order to center the whisker wire accurately on a preformed electrode area of the semiconductor; horizontal and vertical motions of said holder; and vertical motions of plating element 85.

A schematic showing of the means for substantially all of these motions will be found in Figure 4.

Starting the consideration of this diagram with the wire feed unit 81, it will be seen that this unit is connected with the support structure 5 thereof, for vertical movement of the feed unit, by an eccentric or crank 101 and a crank link 102. Thus the feed unit 81 can perform small upward or downward movements, covering for instance up to about ⅛ inch. The unit moves along a wire 103, desirably formed of nickel, measuring for instance one thousandth of an inch in thickness and downwardly extending from a small spool or reel 104 which is supported at 105. The upward or downward motions of the feed unit 81 are controlled, through the eccentric 101, by mechanism which may include a pair of pneumatic cylinders 106, 107, a rack 108 reciprocated thereby, a gear 109 controlled by the rack and a shaft 110 between the gear and the eccentric 101, the parts 106 to 110 being supported on the unit 5 as shown. Gripping or releasing of the downwardly extending wire 103 can be achieved by incorporating in the feed unit 81 a first jaw member 111, movable relative to the link 102 and a second jaw member 112 opposite the member 111 and fixed to link 102. A link 113 rigidly connects the jaw 112 with a pneumatic cylinder 114; and a link 115, controlled by said cylinder, is connected with the jaw 111.

For a complete understanding of the parts 101 to 115 and particularly of the manner in which the wire 103 is held in downwardly extending position, reference must now be made to the gripping jaws 82. While these are shown in Figure 4 as being withdrawn from the wire 103, they can be moved into and out of gripping relation to this wire, by means of a pair of pneumatic cylinders 116, 117, a rack 118 therebetween, a gear 119 controlled by the rack, linkage 120 controlled by the gear and a small platform 121 on said linkage and whereon the aforementioned gripping jaws 82 are mounted. An additional pneumatic cylinder 122 is provided to effect clamping and releasing motions of the gripping jaws 82 relative to one another. The mechanism 116 to 121 can bring the jaws 82 into such position that they, on actuation of cylinder 122, grip an end portion of wire 103, so that this wire is vertically extended between said jaws on the one hand and the reel 104 on the other. Thereupon the clamp mechanism 111, 112 may slide upwardly along the wire 103 for subsequent measuring out of a small length of the wire, preparatory to the cutting off of the whisker unit. The cutting off, as well as forming operations to be described hereinafter, can then be performed by the jaws 83, which for this purpose may be mounted on a mechanism identified by number 123 and which may largely resemble the mechanism 116 to 122.

The parts 101 to 123, described up to this point, are directly or indirectly mounted on a table 124, the wire feed mechanism 106 to 110 being directly mounted on a post 125 which is rigid with this table. The table 124 and post 125, and thereby the wire 103 and the elements 81, 82, 83 operating thereon, can be shifted relative to other parts, to be described presently, by two servo-motors 18, 18A, controlled by the optical system 16, 17, 16A, 17A. For this purpose the said motors are mounted by brackets 126, 126A on an underlying table 128, while an intermediate table 129 may have linkages 130, 130A installed thereon which are actuated by the motors and which serve to adjust the position of the uppermost table 124. Table 128 is rigidly held to frame 55 by structure 131.

The operative position of the optical system 16, 17, etc., controlling this table by the servo-motors, is rigidly predetermined by suitable mounting means 127, 442 anchored on the fixed, lowermost table 128 and/or frame 55, so that this optical system establishes a pair of fixed, reliable, horizontal axes X, Y, which coincide with the axes of the light beams from light sources 17, 17A and which are desirably arranged at right angles to one another. Because of the required motions of the gripper means 8, cutter means 10, etc. along the tables 124, 128, 129, the axes or coordinates X, Y are best arranged diagonally of said tables, as schematically shown in Figure 4 and more clearly evident from Figure 3. At the intersection of X and Y a vertical axis Z is shown in Figure 4; this axis is mechanically-geometrically established by the mounting of the optical means establishing axes X, Y.

A major purpose of the present method and apparatus is to keep all operative devices and materials as close as possible to the intersection of axes X, Y, Z, from the start, and to orient all parts accurately, rapidly and effectively, with respect to the precise location of said intersection. Accordingly all vertical movements, performed by devices 5, 11, 13 are guided in directions strictly parallel to the central axis Z, and with the principal portions 81, 84, 85 of said devices centered on said axis, when in operative positions. The horizontal movements are of a compound nature, the number of moving parts being relatively great and their interactions being relatively complex. At the present point it may be noted that the lowermost table 128 is stationary; the intermediate table 129 is movable over minute distances along axis X; the uppermost table 124, with parts mounted thereon is similarly movable along axis Y; and certain parts on the uppermost table—the gripping, cutting and bending means 82, 83—are movable, in different horizontal planes, across the axes X and Y.

Somewhat more detailed reference may now be made to particular features of said motions, and initially to those of the plating tank 11, for which purpose continued reference is made to Figure 4. The tank 11 must rise and descend rapidly, but accurately, relative to the whisker wire fed out by mechanism 5 and held by the mechanism 8. The tank is therefore provided with selective fast and slow motion control means. For instance, a standard 140, forming part of support and control means 12 for this tank 11, may normally be held in a lower position on the free end of a rocker arm or lever 141, having two pivot members 142, 143. The pivot member 143, shown as a crank or eccentric, is connected with the arm or lever 141 between the pivot 142 and the standard 12; and the eccentric 143 is rotated by a shaft 144, rigid with a gear 145, which in turn is driven by a rack 146 under the control of a pair of hydraulic pistons 147, 148, this latter mechanism being similar to that described above with regard to the feed control member 5. In the present case, however, even more precise motion is required than is provided for the feeding out of the whisker wire. Therefore the pivot 142 is shown in the form of a minute eccentric, mounted on a shaft 149, this shaft and eccentric being driven by a gear 150 which in turn is driven by a worm 151 on a shaft 152, actuated through a clutch 153 by a motor 154. (Also see Figure 1 for this motor and clutch.) Thus, when a certain rapid rise has been effected, by parts 141 to 148, a final, slower and more precise rising motion can be effected by parts 141, 142 and 150 to 154.

Referring now to the supporting and vertical motion controlling unit 14 of the fixture 13 (Figure 4), this may have a mechanism 160, similar to the unit 140 to 154 and comprising similar clutch and motor elements 163, 164 (Figure 1). Desirably the fixture 13 is also equipped with a slide 170, horizontally shiftable in forward and backward directions by means comprising a piston unit 171 and serving to effect, among other things, the ultimate ejection of semiconductor carriers, with semiconductor blanks and whiskers thereon, on completion of the whisker-forming and attaching operations performed by the machine. These and certain other parts will best be considered in connection with the more detailed parts of the drawing.

Figures 5, 6:
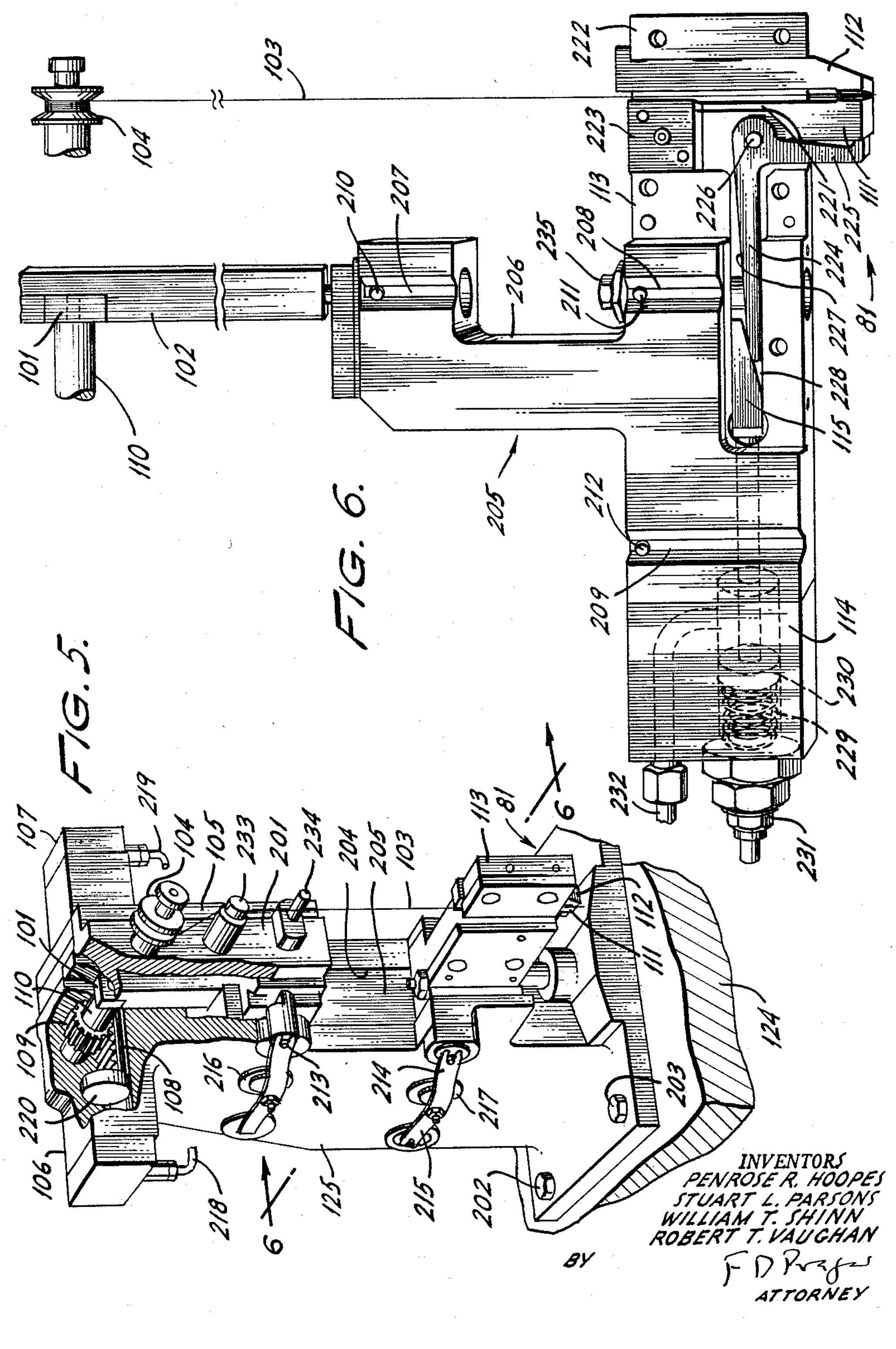
Figure 5 is a perspective view of a wire feeding subassembly, shown at 5 in Figures 1, 3 and 4, with certain portions broken away in order to disclose other parts.
Figure 6 shows a portion of said wire feeding subassembly in a perspective view taken along the line 6—6 in Figure 5.

Therefore, reference is now made to Figures 5 and 6, wherein the wire feed unit 5 and component parts thereof are shown in greater detail. Referring particularly to the aforementioned reel 104 for whisker wire material 103, this reel is mounted on a front surface 201 of the rigid structure 105 which forms a part of the post 125, Figure 5, the latter post being mounted on the uppermost table 124 by bolts 202, 203. Behind this front surface 201, a groove 204 extends vertically in the post 125 and in this groove a sliding member 205 is provided.

This member is shown to best advantage, and by itself, in Figure 6. It has a generally vertical portion 206, the top of which is connected with the link 102 of the aforementioned eccentric 101 for vertical feed strokes and return strokes, while the rigid horizontal member 113 is secured to the lower end of the vertical portion 206 to provide holding means for the feed jaws 111, 112 and for the pneumatic actuator 114 thereof. The vertical movements of the sliding member 205 are desirably facilitated by ball bearing means, and for this purpose vertical grooves 207, 208, 209 may be machined into said member for the guidance of bearing balls 210, 211, 212. These bearing balls are desirably held by resilient forces provided by spring and retainer means 213, 214, 215 (Figure 5), mounted on the outside of post 125 at points 216, 217. While such ball bearing means are shown as being incorporated on one side of the wire feed structure, it will be understood that similar provision is normally made on the other side, in order to make sure that the small vertical movements of the element 205 may be executed with smoothness and accuracy.

The motive force for these movements is provided by compressed air, introduced into cylinder 106 or 107 (Figure 5) by connector duct 218, 219, for the actuation of piston means 220, which may shift the rack 108 from one side to the other. The required control can be provided by suitable valving 62c etc. in the base 51 (Figure 2), and such valving in turn can be controlled by the electrical timer means 64 in the control housing 53. In Figures 5 and 6, the vertically slidable member 205 is illustrated at a low point of the travel available for the same, and the piston means 220 has been displaced toward the right. Suitable timer and valve actuation causes pneumatic pressure to be admitted to cylinder 107, while causing cylinder 106 to be connected to the atmosphere, whereupon the piston means is driven toward the left. This causes rack 108 to rotate gear 109, shaft 110 and eccentric 101 over an arc of up to 180°, which in turn causes an upward motion of the link 102 and slider member 205.

During such upward movement the wire feed jaws 111, 112 must release the wire 103, which is to be displaced in a downward direction only. Such release may be effected by a resilient member, such as a leaf spring 221 (Figure 6), securing the movable jaw 111 to the rigid section 113 and resiliently biasing it away from the rigidly installed jaw 112. Suitable holders 222, 223 for the two jaws are shown at the right hand end of member 205. The release of the wire 103 as well as the subsequent clamping thereof is controlled by a bell crank lever 224, 225, pivoted on the structure 113 at 226 and having one arm 225 engaging the movable jaw 111 to press it against abutment 112, with wire 103 therebetween, while the other lever arm 224 has an upper cam surface 227 cooperating with a lower cam surface 228 of the aforementioned pneumatically actuated member 115 to allow controlled but delicate application of pneumatic forces for this clamping of the thin wire 103. The motive power for such clamping is provided by the aforementioned cylinder 114, which for this purpose may be equipped with a spring 229 adapted to press a piston 230 toward the right as seen in Figure 6, under the control of spring adjustment member 231, while a return movement of the piston from right to left may be enforced by pneumatic pressure admitted through connector tubing 232, under suitable valve control. Of course it will be realized that these arrangements as well as other details of the construction described herein are subject to numerous modifications. For instance a variety of guiding and tension adjusting devices 233, 234 may be provided along the wire 103 as shown in Figure 5. The clamping stroke of feed unit 81 (Figure 6) may be limited by a set screw device 235.

Referring now to Figures 7 to 9, it will be noted that a second pair of jaws 251, 252, jointly forming the principal part 82 of the gripping assembly 8, are disposed directly below the aforementioned feed jaws 111, 112, when the gripping assembly 8 has been shifted toward the right as most clearly indicated in Figures 3 and 7. In a general way the operation of the gripping assembly 8 and of its transfer unit corresponds with that of the jaw mechanism 111, 112 of feed unit 5, excepting however the feature that, advantageously, the movements of the feed unit and of the elements thereof are partly vertical and partly horizontal, while all those of mechanism 8 are in horizontal planes.

As to the horizontal translatory movement of the gripping unit it will suffice to note briefly that the aforementioned cylinders 116, 117 of transfer mechanism 8 are rigidly installed in a block 253, which may be secured by a bolt 254 to an arm 255, suitably held to the front of the uppermost table 124 (Figure 4) and that said cylinders (Figure 7) have piston means 256 therein. Pneumatic pressure is connected at 257, 258 to said cylinders for moving this piston means, while the pneumatic system 62, 63 (Figure 2), controls this pressure and thereby the aforementioned rack, gear and crank mechanism 118, 119, 120, the crank being adapted to slide the secondary support member 121 horizontally along a guide system, schematically shown at 259, on block 253, for transferring the wire gripping subassembly 82 in a modified harmonic motion.

For the then following pivotal motion of jaws 251, 252 the aforementioned cylinder in the secondary support 121 (Figures 7, 8) may have single-acting pressure supply means 260 and a return spring, not shown, with spring adjustment means 261, for the control of a jaw-actuating piston member 262. Each gripping jaw, as best shown in Figure 8, is formed at one end of a two-armed lever 263, pivoted on the secondary support member 121 at 264 for horizontal, angular motion. The opposite arm 265 of each lever has a cam surface 266 thereon, which is engaged by a surface 267 on the piston member 262 so that rightward shifting of the piston member, as seen in Figure 8, causes spreading of arms 265 and inward or gripping movement of the jaws 251, 252. A reverse or releasing movement of the jaws is effected by a return spring 268 for each lever, abutting against and held by a suitable spring retainer 269.

The gripping apparatus 8, described up to this point, can readily be made as accurate as the feeding apparatus 5, described above, the cam means 262 operating in a manner similar to that of cam means 115 (Figure 6). Additionally, still finer adjustment is sometimes required for the gripping apparatus, as this apparatus must match the predetermined, precision-adjusted position of the thin and flexible wire, established by the feeding apparatus, and must also compensate to some extent for such irregularity of wire position as may be caused by the operations of the feeding apparatus. Accordingly each gripping lever 263 is not only adjustable in and on the pivot means 264 thereof, by suitable set screw means 270, but in addition, as also shown in Figure 8, a fine adjustment of jaw positions and gripping pressures is provided by a set screw 271 on each lever arm 265. Each set screw 271 is threaded into a rigid outer portion 272 of the respective arm 265, which is secured to the corresponding, equally rigid, gripping portion 251, 252, whereas an inner portion 273 of each of said arms may be provided in form of a thin resilient bar or leaf spring, terminally secured to the rigid portion, for instance at the pivot member 264. Each cam surface 266 is formed on an opposite end of the inner, resilient portion 273 of the arm 265, which end can be inwardly or outwardly adjusted or spaced from the adjacent part of the rigid lever element 265 by means of the set screw 271, the inner end of which bears against portion 273. By this expedient the effective dimensions of the lever arms 265 can be varied and a predetermined, longitudinal stroke of the piston member 262 can be caused to effect different angular movements of the levers 263 and jaws 251, 252.

In the enlarged view of Figure 9 these jaws 251, 252 are shown as gripping the wire 103. It will be understood that the motion control for jaws 251, 252 is such that, at the end of the lateral stroke performed by mechanism 8 (Figure 7) the wire 103 is substantially centered with respect to the gripping surfaces. The set screw adjustment members 271 (Figure 8) are able to insure such centering. As shown in Figure 9, one of the gripping jaws, 251, has a short gripping surface 274, at one end of a small projection 275. This surface 274 may be about three or four mils long if the wire 103 is one or two mils thick. Larger surfaces, involving greater thermal masses, are often undesirable at this point. The opposite jaw surface 276 forms part of a small resistance heating electrode 277 which in turn forms part of jaw 252, and said surface 276 may be somewhat longer than the first mentioned surface 274. The electrode 277 is mechanically and electrically connected, at 278 (Figure 9) and 279 (Figure 7) to allow passage of current through the electrode, without passage thereof through the wire 103. This arrangement has been found most adequate to provide the required, conductive heating of wire 103, for melting solder spheroid 103A. It prevents undesired side effects, such as overheating of portions of the thin wire and irregular soldering temperatures.

Referring now to the wire cutting and bending mechanism 10, shown in Figure 10, this is normally arranged with the operative part 83 thereof opposite the operative part 82 of the gripping mechanism 9, in an approximate in-line relationship as approximately represented by Figures 8 and 10, with the wire 103 (Figure 7) centered therebetween. It may be preferred, however (Figures 3 and 4) to arrange the cutting and bending mechanism for translatory motion at an angle to the motion of the gripping mechanism, and only to keep the terminal position of one element 632 (Figure 10) in line with element 121 (Figure 8) in order to suitably orient the cut-off and bent whisker portions.

The cutting and bending jaws of mechanism 83 (Figure 10) are disposed slightly above the gripping jaws 82 of mechanism 8. They are, on the other hand, below the feed jaws 81 of unit 5 (Figure 7), when jaws 81 have been raised relative to the gripping jaws 82. Thus cutting and bending jaws 83 can be horizontally inserted between the devices 81, 82. This insertion is effected by means 10 for major lateral motion, Figure 4, which means may be substantially identical, in design, with the grip jaw moving mechanism 8, Figure 7. The subsequent, pivotal movement, causing the actual cutting and bending, may be effected by an auxiliary mechanism similar to that shown at 8 (Figures 7 and 8) except that it is preferable, in the cutting mechanism of Figure 10, to provide a piston member 280 with a single cam surface 281, actuating a single movable lever 282, against return spring 283; the cooperating lever 284 of this device being rigidly secured to the housing 285 of the cutter device, for instance at 288. Adjustment screw means 287 for the movable cutter lever 282 may resemble the gripper jaw adjustment unit 271; and a cam engagement surface 288 for the cutter lever may resemble the gripper cam surface 266. A stop for jaw 632 is shown at 289.

When the feeding and gripping devices 5, 8 (Figure 7) have placed and substantially fixed one end of the continuous whisker wire 103, and usually before the cutting off and further shaping of such wire, other machine elements perform further work on the end of the wire. The first such element is the plating tank assembly 11, shown in Figures 11 and 12. This assembly comprises, as best shown in Figure 11, an outer container 301, desirably of stainless steel or the like, and which surrounds an inner container 302, for instance of heat resistant glass, for a plating and fluxing solution. Both containers are open at the top to provide the aforementioned aperture 85. The outer container may also have exhaust ports 303, peripherally spaced around the inside of a rim portion thereof, above the glass container, and leading to an annular exhaust duct 304 in said outer container. In order to minimize or prevent condensation of solution vapors on adjacent parts and materials, an exhaust tube 305 is connected to this annular duct 304. The tube may lead to a pneumatic suction device, not shown, which may be suitably disposed in the support structure 51 (Figure 1).

A plating electrode or carbon rod 306, having a part (not shown) which extends into the glass tank 302, is removably held by a clip 307, secured to a tank holder 308 by fasteners 309, so as to insure easy removal and insertion of the electrode. Suitable wiring, not shown, connects this electrode with a plating regulator portion 66 of the control unit 53 (Figure 2). Since it is necessary to move the plating tank through the atmosphere and yet to plate the end of the whisker wire with solder metal at a closely controlled temperature, as will be explained hereinafter with reference to Figures 44, 45, a heating element 310 (Figure 11) is desirably installed in the holder 308 directly below the containers 301, 302, and provided with current of adjustable density, by conductors in a cable 311, leading to said plating regulator portion of the control unit. Undesirable heating of the ambient space is minimized by constructing the tank holder 308 of a heat-insulating material, as is suggested in that part of Figure 11 which shows a portion of said holder in cross-section. In order to provide the accurate control over the plating process, a thermo-couple 312 is installed within a riser 313 integrally formed in the glass tank 302. Suitable lead wires to and from the thermo-couple, in a cable 314, may lead to the temperature sensing and regulating portion 67 of circuits 66, etc., in control unit 53 (Figure 2), which in turn controls the operation of the heating element 310 (Figure 11).

While the tank elements 11, 85 (Figure 3) can be small, the presence thereof in the work area 3, during certain phases of the machine cycle, would interfere with the gripping and cutting members 82, 83, among other things. For this reason, and also for purposes of accurate control over the plating process, the tank 11 is arranged to be raised and lowered by the aforementioned mechanism 12 which is best shown in Figure 12 and which may support the tank by a bracket 320, secured to the standard 140. The lower end of this standard is supported for instance by a roller 321 pivoted in the lever arm 141, and the standard 140 may be guided by suitable ball bearing means, not shown, which may resemble the guiding means 207 to 212 of the wire feed unit, shown in Figure 6, and may suitably be housed in a structure 60 (Figure 1), forming part of the machine frame 55. The tank and its mechanism are normally disposed below and in front of the tables 124, 128, 129 (Figure 4) and behind the board 56 (Figure 1), but the tank is adapted to be raised to a position adjacent the top of the upper table. The normal, low position of the tank 11 (Figure 12) may be insured by gravity and also by a lever 322, acting on the standard 140 at 323 and actuated, at 324, by a member 325 which is biased against the aforementioned frame structure 60 (Figure 1) by a spring 326 (Figure 12).

Rapidity as well as precision is required for the raising and lowering of the tank 11 and also for the corresponding functions of the semiconductor support fixture 13, Figures 1 to 4, not only in order to accelerate the entire operation and thereby to save cost but particularly also in order to make sure that the wire 103, Figure 4, after precision-plating the bead 103A thereon and when this bead contacts the semiconductor electrode and is heat-soldered thereto (Figures 36 to 40), is still covered by a proper amount of unevaporated flux. This is one of the functions which are much more reliably performed by the present machine than they can possibly be performed, or even observed, by a human operator. Accordingly, and in order to rapidly raise the system 11, 12 at the start of a plating operation, the lever 141 (Figure 12) is rocked about the pivot point 327 on the aforesaid eccentric 142, by a crank pin member 328 slidable in a groove 329 in said arm 141 and rotatable with and on the eccentric 143, the other eccentric 142 being fixed at this time. The rotating eccentric 143 is connected by its shaft 144 with pinion 145 which is rotated by rack 146; said rack being rigid with and between two pistons 330, 331 which slide in the cylinders 147, 148 (Figure 4) by pneumatic-mechanical action, similar to the modified harmonic motion of the gripping mechanism 8 (Figure 7).

The rapid raising of the tank assembly from the normal lowermost position thereof is initiated by manual or automatic operation of a switch in the control unit 53 (Figure 1), which controls a suitable pneumatic device 62 (Fig. 2) in the base structure 51, for the operation of the pistons 330, 331 (Figure 12), thereby operating the rapid motion linkage 141 to 146 and raising the tank. The upward motion is then continued more slowly, as will be explained presently, by the slow-drive system 149 to 154. This latter system is also connected, by an extension of the shaft 149, with a switch actuator 332, adjustably adapted to operate either of a pair of slow-motion limit switches 333, 334, positioned at two terminal positions of the said actuator (also see Figure 2).

The complete cycle of the tank motion mechanism may be as follows, subject of course to various changes in detail: manual or automatic switch action in unit 53 (Figure 1) initiates a rapid, pneumatic-mechanical rising motion of rocker lever 141, about the then fixed pivot 327 (Figure 12). This motion in due course causes actuation of a primary upper limit switch 335 by an actuator 336 on support 140, which causes the slow-motion motor 154 to take over and the rocker arm 141 to swing about the now fixed pivot 328; the rapid motion coming to an end promptly thereafter. Soon thereafter the operation of the motor 154, overriding switch 335, causes actuation of the upper slow rise control switch 333 by actuator 332 and also establishes contact between the electrolyte liquid surface in tank 11 and the lower end of the whisker wire (Figure 23), whereupon a time delay mechanism (not shown), forming part of interlock system 65 (Figure 2), causes continuation of the slow rise, further overriding switch 335 and now also switch 333, until a predetermined number of mils and/or fractional mils of the wire have been immersed, for instance until an immersion by .00255 inch has been effected with an accuracy of plus or minus .00001 inch. Such control is sometimes required to provide proper plating of the wire; good and consistent results of the ensuing soldering cycle may depend thereon.

When the plating has been completed, suitable interlock action causes reverse motion of the pneumatic-mechanical system, desirably starting with fast downward motion, which causes actuator 336 to actuate the primary low limit switch 337. That switch causes renewed operation of slow-motion motor 154, which now lowers lever 141 by eccentric 142 until the starting position has been re-established, at which time the second slow-motion limit switch 334 terminates the cycle. The immediate start and rapid performance of the downward withdrawal of the tank facilitates the following operations.

As to these, relatively brief reference may now be made to Figures 13 and 14, showing the mechanisms 13, 14 for horizontal and vertical motions of the carrier 350 and the aforementioned front portion 135 thereon (Figure 4) which carries the semiconductor blank 351 to be provided with a whisker (Figure 13). Initially it must be noted that the motion of this carrier, relative to the whisker, may require a maximum of precision, sometimes with even greater accuracy than the tank motion provides.

The fixture 13 for the support of the semiconductor carrier is secured to the vertical motion control mechanism 14 (Figure 14) by a rigid arm 352. Provision is made for horizontal, accurately guided, forward and backward motions of the carrier, under the control of a carrier slide member 170 (see also Figure 4); this slide member is shown as displaced toward the work area in Figure 13 but as oppositely displaced for ejection of the carrier in Figure 14. The intermediate horizontal motion of the member 170 may be performed manually when inserting the carrier 350 on fixture 13, whereas the return motion is automatically effected by the pneumatic means 171, which may resemble the controls of the wire feed or wire gripping devices. Normally, the carrier rests on a support portion 353 of fixture 13 and is oriented by guide means 355 cooperating with resilient means 356 to insure precise centering of semiconductor 351 with the vertical axis Z (Figure 4). Presence or absence of a carrier, on the fixture, may be detected by a switch 357 (Figure 14) suitably connected with the interlock controls 65 (Figure 2).

For the vertical motions of mechanism 14 (Figure 14) the fixture 13 and arm 352 may be mounted on a standard 370, generally resembling the standard 140 of the tank 11 (Figure 12) and vertically motivated by a mechanism 160 (Figure 4) having a rapid drive 371 and a slow drive 372, similar to the tank-controlling elements 328 to 331 and 150 to 154 (Figure 12). Vertical guide members 373 (Figure 14) may be provided for such a standard, in ways similar to those of the wire feed unit, shown at 207 to 212 (Figure 6). The interlocking circuit unit 65 (Figure 2) may comprise a circuit controlled by slow-motion limit switch members 374, 375 (Figure 14) similar to those of the tank mechanism shown at 333, 334 (Figures 2 and and 12). Additionally, the present system comprises two primary limit switches 376, 377 (Figure 14), vertically spaced from one another by a close distance and directly actuated by adjustable actuator means 378 rigid with standard 370.

The basic cycle of the limit switches 374 to 377 can be substantially similar to the above-described cycle of the tank motion switches (Figure 12), except that the spacing and positioning of the primary fixture limit switches 376, 377 (Figure 14) can and must in many cases be closer than the spacing and positioning of the tank limit switches. Also, a maximum of accuracy is often required as to the operation of the upper slow-motion limit switch for the fixture 13 as the semiconductor blank, at the point of contact with the spheroid 103A usually has minute thickness, such as a few hundred thousandths of an inch, and must nevertheless be exposed to predetermined, firm pressure by said spheroid, in order to establish reliable metal-to-metal contact and thereby to insure successful soldering (Figure 45).

It may be noted at this point that a portion 380 of the fixture 13A, shown in Figure 14, may be provided with a device 381, shown with great enlargement in Figure 15, while fixture 13 (Figure 13) has no such portion. The portion 380 (Figure 14) extends into the work area and serves, by the device 381 (Figure 15), to facilitate the attachment of a second whisker 382, for instance to a so-called micro-alloy semiconductor unit 383 which must be exposed to relatively high soldering temperatures, while damage to a previously attached whisker 384 of course must be avoided. Device 381 may comprise a yoke 385 having pivot means 386 secured at 387 to the legs thereof, for engagement with suitable pivot means 388 on the front 380 of the carrier fixture 13A (Figure 14). The arms of the yoke (Figure 15) have a weight 389 secured thereto in order to normally bias one side 390 of the web 391 of the yoke, with a slot 392 therein, toward the top. When inserted, as shown in Figure 15, the web 390 brings the slot 392 to a fairly close fit around the bent whisker wire 384, previously attached to semiconductor 383, and a surface of web 390 supports this wire, thereby protecting it from any danger of shifting or becoming loose upon the unavoidable re-heating and possible softening of the first electrode member, incident to the attachment of the new wire 382. After the congealing an arm 393 causes automatic reversal of the yoke, on pivots 386, 388, by engagement with some other part of the fixture 13A, not shown, in order to effectively withdraw the web 391 from the whisker-supporting position shown when the semiconductor 383 and its carrier, after congealing of the solder, are ejected from the fixture. Friction between whisker 384 and any part of fixture 13A can be minimized by this expedient.

When the semiconductor 351 (Figure 13) has been inserted in the work area, it becomes necessary to register the plated end of the whisker wire relative to the so inserted semiconductor with the greatest possible accuracy, as the centering of the rigid semiconductor can be effected by suitable guide 355, 373, while the motions of the thin wire are without such guidance in order to allow the gripping, plating, cutting and bending operations. The important and difficult operation of registering the wire with the vertical axis of the system is automatically performed by the optical system and servo mechanism, shown in Figures 16 to 19.

Figures 16 and 17 shows features of one of the two identical optical systems, the system 16, 17, which features are indicated more generally in Figures 1 to 4 and which serve to automatically develop the information required for the precise positioning of the whisker relative to the vertical axis and thereby to the semiconductor. The light source element 17 comprises a lamp 401 having some suitable socket 402. Conductors 403 may extend through a rigid post 404 to the socket. The lamp housing 405 may be swung on post 404 into and out of a precisely fixed position above the work area (Figures 1 to 3); the post 404 being suitably anchored in the basic support structure 55. A suitable optical system, schematically shown as comprising lens 406 (Figure 17), is installed in the front part 86 of the housing 405, in front of the lamp 401, to form a beam of light which uniformly illuminates the bead 103A. The beam continues toward the center of the objective lens 407 in the front part 87 of the telescope 408, forming part of the imaging device 16. Lenses 407, 409, etc. of the telescope are so selected and mounted that, when the small whisker spheroid 103A is supported in the working area 3, a real image of said spheroid is formed in a photosensitive unit 410 forming part of the system 16.

In addition, and for auxiliary visual observation, a mirror 411 is normally but removably inserted in the optical path of the telescope, so that suitable, pneumatically operated linkage 412 (Figure 16) can swing the mirror into said optical path to provide a real image of the whisker, on a viewing screen 413 supported by an attachment 414 of the telescope and photocell housing 408. At a certain moment, however, the mirror 411 is removed by said linkage from said optical path, as shown at 411A (Figure 17), so that the image of the whisker falls onto the photocell 410, through a suitable slot 415 in the instrument housing. Interposed between this slot and the photocell is a movable, light stop element 416, desirably of cylindrical form and rotary motion, around cell 410, which admits only alternately selected portions—preferably alternate, laterally juxtaposed halves—of the spheroid image to the cell, by suitable apertures in and shutter motions of this element 416. It is preferred to combine this shutter element with a light chopper arrangement, in a basically known way, providing a readily amplifiable cycle of photocell information, for instance at a frequency of 1800 revolutions per minute. Thus the light stop element 416 serves as a combined shutter and chopper. It may be contained in a cylinder housing 417 and may be driven by an electrical motor 418. The cyclic response of the photocell is fed by suitable leads, contained in a cable 419 (Figure 16), to a suitable amplifier in the servo control stage 68 of the control unit 53 (Figure 2), where an output signal is derived from said response, in known manner which need not be described herein.

The photocell signals of the two optical units are accordingly used for the automatic control of the mechanical portions of the two servo systems; and one of these systems is shown in Figures 18 and 19. Referring particularly to Figure 18, it will be noted that the phototube output leads 419 are connected, through the schematically shown control unit 53, with input circuit means 420 of the servo motor unit 18. The servo motor proper, shown at 421, may have an output pulley 422, connected with a second pulley 423 by a belt 424. As previously mentioned (Figure 4) the servo motor is mounted by a bracket 126 on the lowermost table 128. It will now be noted (Figure 19) that the second pulley 423 is mounted on a shaft structure 425 which is suitably held on a bracket 426, secured to the intermediate table 129 at 427. By means of a hub structure 428, the shaft 425 may effect micrometric shifting of a set screw or push rod member 429, which bears against one end 430 of a bell crank lever 430, 431, pivoted in the intermediate table 129 at 432. The opposite lever arm 431—by means of a crank or roller member 433 biased in one direction by a spring structure 434—moves a pin structure 435, depending from the upper table 124. As shown in Figure 18, the pin structure 435 is fitted in a suitable aperture 436 in the overlying, uppermost table 124. Movement of the lever arms 430, 431 may be facilitated by forming suitable apertures 437, 438 in the table 128 (Figure 19).

By virtue of the interposition of the crank member 433 (Figure 19) the lever 430, 431 can accurately move the pin structure 435 and thereby the upper table 124 in a straight line, the direction of which can be predetermined by a guiding and supporting structure 439, 440 to coincide with the direction of one of the axes X, Y (Figure 4). The guiding structure may comprise for instance ball members 439 in short, suitably oriented V-groove members 440, oriented diagonally of the tables 124, 128, 129, along one of the axes X, Y. The uppermost table (Figure 18) rests on supports 439, 440 and is accordingly shifted in the diagonal direction defined by groove members 440. The required extent of movement of the upper table, along each axis X and Y, will usually amount only to a few millionths or hundred thousandths of an inch; such minute movement, however, is frequently required during many, if not all, of the consecutive whisker attaching operations performed by the machine. The reason is that the semiconductor electrode area (Figure 44) usually has only a few thousandths of an inch diameter; that exact centering of the fine whisker, within such area, is of great importance for the consistent production of adequate semi-conductor devices, at least when certain desirable features of such devices shall be obtained; and that such centering of a freely extending, extremely thin wire seems to be possible only by a positive servo mechanism.

It will readily be seen that a second servo mechanism 18A, of the same kind as that shown in Figure 18, is installed on the opposite end of table 129 (Figure 19). It is generally indicated at 423A, 432A, 438A. It is preferred, however, that the crank member of the second mechanism extend downwardly, rather than upwardly, from the intermediate table 129, and that the pin member engaging it be mounted in a hole 436A in the lowermost table 128 (Figure 18). For the support of the intermediate table, from said lowermost table, ball bearings 439A are provided. By means of this expedient it is possible to use identical parts for both servo mechanisms 18, 18A. Other advantages are also obtained; particularly, mechanical friction and binding are minimized.

It may be noted that apertures 441 are formed in the intermediate table 129 (Figure 19). Similar apertures are also formed in the uppermost table; they serve to allow the firm and rigid mounting of support members 442 (see Figures 3 and 17) for the objective end portions 87 of the two telescopes, controlling the servo system. In addition, of course, it may be desirable to form further apertures to reduce the weight of the tables.

The operation or normal cycle of the machine can now be described. It is schematically illustrated in Figures 20 to 43.

Figure 21:
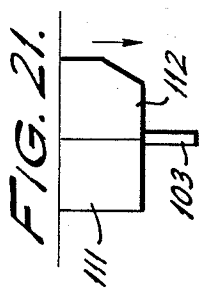
Figure 25:
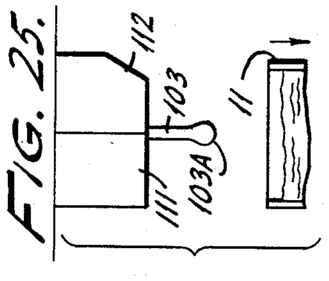
Figure 29:
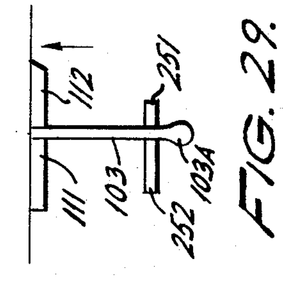
Figure 20:
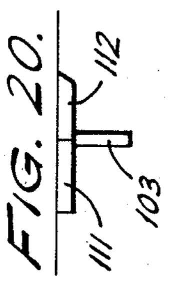

The cycle may begin with a wire feeding operation, represented by Figures 20 and 21. At the start, the feed jaws 111, 112, indicated in these figures and more completely shown in Figures 4 to 6, maintain gripping pressure on the wire 103. This pressure has previously been established by a horizontal movement of the jaw 111 (suggested by the arrow in Figure 30), which movement has been effected by the piston member 115 moving toward the right as seen in Figure 6. For that purpose, one of the solenoid valves on base 51 (Figure 2), particularly for instance the valve 62C connected to the pneumatic pressure line 232 (Figure 6), has been reversed, either by automatic operation of the programming apparatus 64 in the cabinet 53 or by manual operation of a switch 501 in the front of this cabinet (Figure 1). The latter switch is interlocked with the apparatus 64 by the circuit system 65 (Figure 2).

From the so-established wire gripping positions (Figure 20) feed jaws 111, 112 move downwardly in the direction shown by the arrow in Figure 21, by means of suitable actuation of the pneumatic mechanism 106, 107 (Figures 4 and 5). This actuation may again be effected, as aforementioned, by automatic mechanism, or by manually operating a switch 502 in the front of cabinet 53, Figure 1.

Likewise, and as further shown in Figure 1, automatically or manually controlled operation is provided for certain further operations, by means including switches 503 to 512, similar to the switches 501, 502, and also including conventional master switches, such as: a switch 513 for selecting manually or automatically controlled operation; a switch 514 for causing completion of full or split cycles, as may be preferred in various cases; start and stop switches 515, 516 for use in the manually controlled operations; a main power switch 517; and special on-off switches 518, 519, connected respectively to the optical equipment, and the plating and/or soldering equipment. The so-identified switches may be associated with indicator lights 501A, 515A, etc., as is well understood in the art.

Some operations are perfomed and controlled only by purely automatic means, mainly in the interests of achieving greater accuracy or speed, or both. It is believed to be sufficient hereinafter to indicate, as to each operation, whether manual/automatic or purely automatic control is provided in the machine as disclosed, it being understood that the manual control, if any, is effected through one of the individual control switches 501 to 512. It will suffice to list and briefly to identify typical, manual, double-throw control switches as follows: 501, feed jaw clamping and opening, as already mentioned; 502, feed unit raising and lowering, also just mentioned; 503, plating tank raising and lowering, fast; 504, same, slow; 505, wire gripping unit, sliding in and out; 506, wire cutting and bending unit, sliding in and out; 508, wire cutting and bending jaws, operating and releasing; 509, servo motors, off and on; 510, transistor fixture raising and lowering, fast; 511, same, slow; and 512, transistor carrier slide and ejector, in and out.

Figure 24:
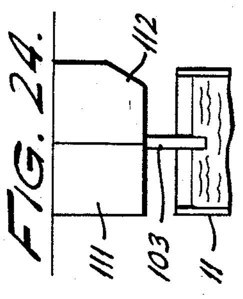
Figure 28:
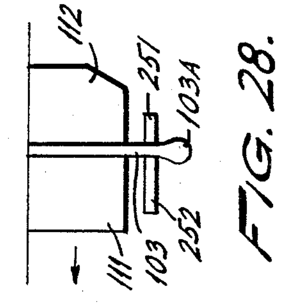

In the preferred operation of the machine there follows next upon the wire feeding and gripping, so far described, a plating cycle illustrated in Figures 22 to 25. As an initial part of this cycle the plating tank unit 11 is rapidly raised by one of the said manual-automatic operations and by the mechanism fully described above, see the arrow in Figure 22. At the end of the rapid rise, prior to but adjacent the position of Figure 23, the switch actuator 336 (Figure 12), effects purely automatic activation of the switch 335, which can be replaced by a suitably interlocked, manual switch operation, thereby causing the starting, through suitable circuitry not shown, of the slow rise motor 154, as a result of which the tank 11 now rises at a slow rate, suggested by the wavy arrow in Figure 23, over the short distance leading to the point where the liquid level of the plating solution in the tank contacts the tip of the wire 103, said liquid level being kept in smooth and flat condition by the slow, even motion. The said point is reached within a short time, starting by suitable circuitry the plating control circuits 66 (Figure 2), and also starting by switch 333 the slow rise time delay means, all this in a purely automatic way, except that the time delay mechanism is adjustable at 520 (Figure 1). The slow rise continues until the end of wire 103 has been immersed to a depth accurately predetermined by this time delay mechanism, as shown in Figure 24. Thereupon the time delay means stops the slow rise and causes the automatic commencement—subject to off-on control—of the passage of electrolytic current under suitable control by the previously started circuit units 66, 67 (Figure 2), which are under suitable adjustment by devices 521 (Figure 1), for the deposition of metal from the suitably heated electrolyte in tank 11 onto the wire 103, in form of a tiny bead 103A, Figure 25. Plating current density may be indicated for instance at 522 (Figure 1), being adjustable, as mentioned, at 521, while plating solution temperature may be indicated and adjusted at 523. At the end of the plating period, automatic-manual operation causes the tank 11 to be rapidly, downwardly withdrawn and then slowly to be brought to the starting point, as generally shown by the arrow in Figure 25.

Figure 27:
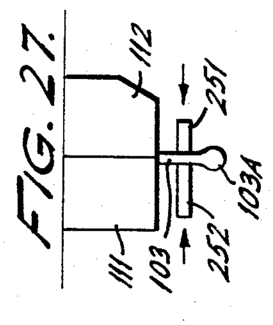

There follows an important, auxiliary operation, illustrated in Figures 26 to 30, which serves to prepare not only for the further operations in the current cycle but also for the start (that is, the establishment of the Figure 20 position) of the next following cycle. This auxiliary operation involves that the gripping jaws 251, 252 of the mechanism 82, in opened position, are bodily translated into such position as to allow gripping of the wire 103, Figures 3, 7 and 8; also see the dot symbol in Figure 26. Thereafter the angular gripping movement, establishing the position of Figures 9 and 27, is executed. Each of these operations, Figures 26 and 27, may be either manual or automatic. Next, and in order to prepare for the following cycle, manual or automatic operation causes lateral releasing of the wire feed jaw 111, as shown by the arrow in Figure 28, while the gripping jaws remain closed. This is followed by upward sliding of the feed jaws 111, 112 along the wire 103, the lower end of which is held by the gripping jaws, see the arrow in Figure 29. Finally the feed jaws 111, 112 close again upon the wire 103, thereby establishing the starting position of Figure 20 except that the gripping jaws 251, 252 are still in position at the present moment, Figure 30.

Figure 31:
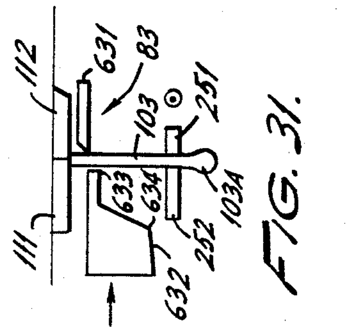
Figure 22:
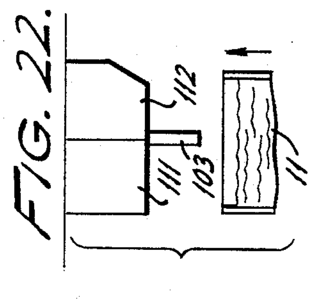
Figure 26:
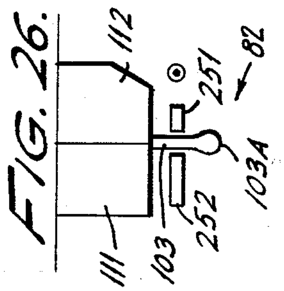
Figure 30:
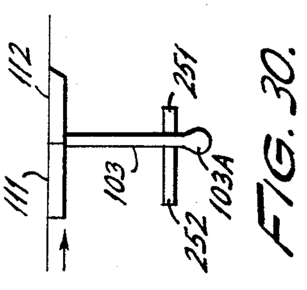
Figures 32, 33, 34, 35, 36, 37, 38, 39, 40, 41, 42, 43:
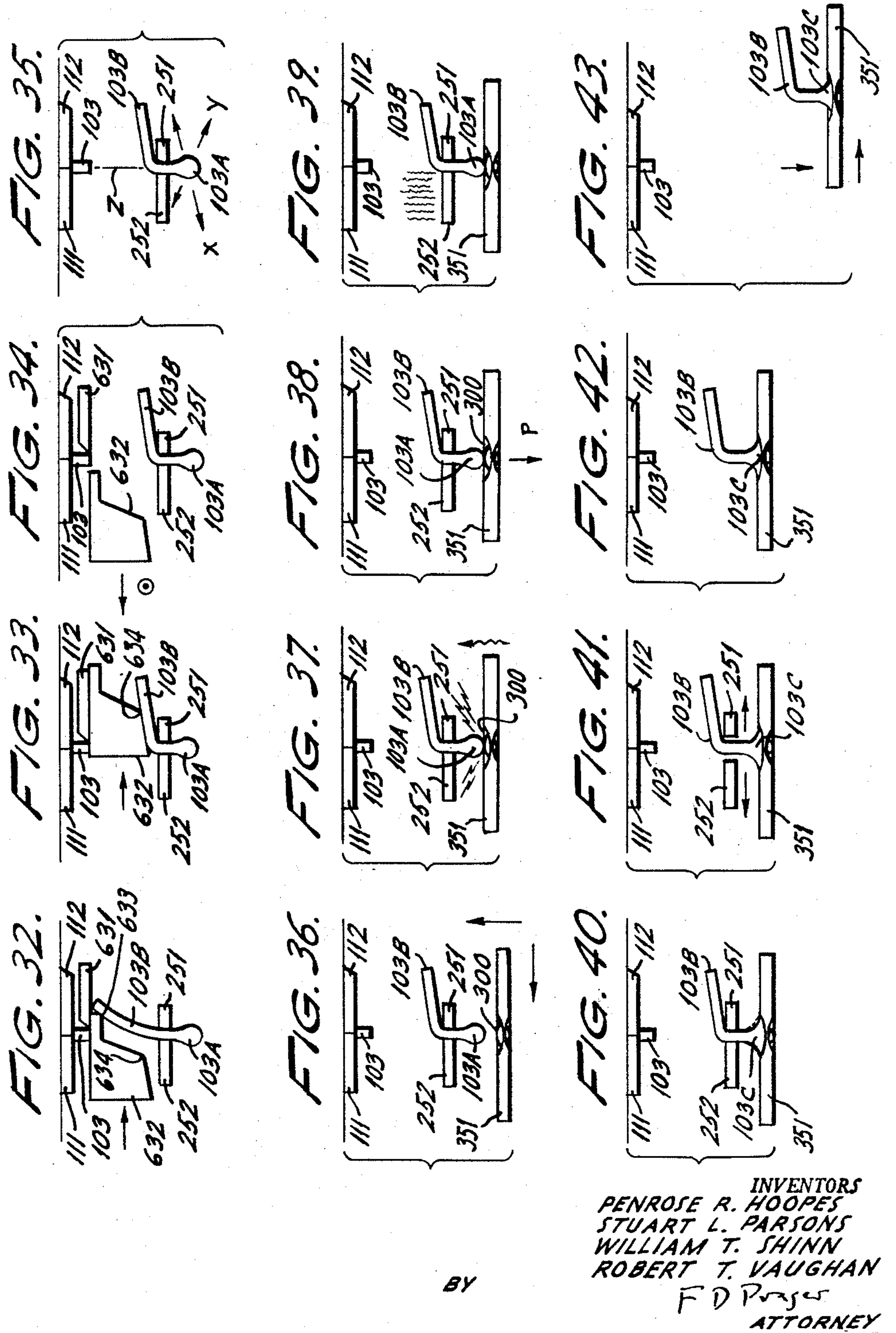

Next follows the cutting off and bending of the whisker as shown in Figures 31 to 34. It starts with automatic or manual moving into position of the opened cut-off jaws 83 (Figure 10 and dot symbol in Figure 31). It will be noted that these jaws approximately fill the space between the wire feed jaws and the wire gripping jaws. In other words, the upward movement of the feed jaws, Figure 29, has exposed such a length of wire 103 as is required to form a whisker and this whisker is now cut off at the top and bent in the usual shape. For this purpose, the upper cutting jaw 631 constitutes a flat knife member while the other jaw, 632, constitutes a relatively heavy, combined knife and bending or forming member; these members 631, 632 having one pair of sharp cutting edges opposite one another and the lower and heavier member having therebelow a primary, upper bending corner 633 and a secondary, lower bending corner 634. These bending corners are generally blunt. The beginning of the cutting off operation may be visualized readily from Figure 31. This entire operation, including the bending step, are performed exclusively by horizontal movement of the heavy jaw member 632, toward the right in Figure 31. This rightward movement continues after the cutting off, Figure 32, whereby initially the upper bending corner 633 engages the top of the cut-off whisker 103B, bending it slightly, and thereafter follows, as shown in Figure 33, a more abrupt and acute bending of the whisker by the subsequently engaging, lower corner 634. Thereafter, Figure 34, the member 632 is swung to its original position (arrow), and the cutting and bending mechanism is slidingly withdrawn (dot symbol).

The next operation is that of Figure 35. It serves the important purpose of precision adjustment of the whisker and bead 103A, 103B, correcting for unavoidable irregularities in the position of the thin wire 103, caused by associated feeding operations and auxiliary steps as generally described above. One of these minute irregularities of position is caused by the unpredictability of the exact points where the gripping jaws grip the wire 103 (Figure 9); another may be caused by elastic stresses in whisker 103B, below gripping mechanism 82, upon the sharp bending indicated in Figure 33. Such irregularities must be corrected in view of the extreme demands on geometrical accuracy of semiconductor electrode design. While similar correction, in the fabrication of some kinds of transistors, has been done manually, with the aid of powerful microscopes, the dimensions involved are so small that proper automatic guidance, as provided herein, is vastly superior to the work of the most talented and most carefully trained human operators, in fact the precision of mechanical centering, by apparatus such as the present one, is indispensable in the fabrication of certain types of transistors and the like.

Accordingly, automatic or manual control causes the optical and servo motor system of Figures 16 to 19 to go into operation and to move the entire wire feeding and gripping system, or at least the gripping portion thereof, in horizontal directions X, Y, established by the fixed light beams or rays, until the center of the bead 103A coincides with the vertical axis Z at the intersection of these light beams. These motions are schematically indicated by the arrows in Figure 35 but they are of much smaller extent than such arrows.

The way in which these motions are produced will be understood in view of the description of Figures 16 to 19, above. It will be understood by persons skilled in the art that the light beams X, Y have suitably defined cross section and distribution of light intensity across the beam and that the so-defined light beams, through the lens systems of the telescopes 408, produce real images of the spheroid 103A and of the illumination thereof, either on the screen 413 or in the phototube 410, depending on the position of the mirror 411 in Figure 17. The illumination of the spheroid, as seen through each telescope, is unsymmetrical until the spheroid has been centered with the intersection of the axes X, Y, across the line of sight of each telescope system (Figures 3 and 4). The rotating light chopper cylinder 416 (Figure 17) can be so arranged as to alternately expose the photocell 410 to right-hand and left-hand portions, or other similarly selected portions, of the complete telescope image. The circuitry 68 of the phototube (Figure 2) causes and continues the operation of the servo motors 421 (Figure 18), in both servo systems, thereby shifting the upper and intermediate tables 128, 124 on their bearings 439, 439A, until the spheroid 103A (Figure 35) has been centered relative to both lines X and Y.

The position of lines X and Y must of course be fixed relative to the supports 51, 55 (Figure 1) by sufficiently sturdy construction of the mountings 404, 442, etc. for the optical system (Figure 17). In addition, recalibration and readjustment of the system can be effected, relative to the framework or relative to a specific portion thereof such as the semiconductor support fixture 13 (Figure 1) or a typical carrier or semiconductor, oriented and supported thereon. The readjustments can be effected for instance with the aid of the auxiliary microscope 58. At all times other than that during which the centering operation of Figure 35 is performed, the auxiliary viewing screens 413 may be in use and the mirrors 411 may be raised by suitable electro-pneumatic action. The centering operation may be so rapid as to be practically unnoticeable in the ordinary observation of the screens.

As shown in Figures 36 to 38, the plated, cut-off, formed and precision positioned whisker is now brought into proper contact with a semiconductor electrode. This operation is started, automatically or manually, if and when a semiconductor carrier 350 (Figure 13) has been inserted in the fixture 13 (horizontal arrow in Figure 36). The actual, controlled contacting of the whisker with the electrode is effected by a rising movement of the semiconductor fixture 13 along a predetermined, accurately maintained vertical path. This rising movement has similarity with that of the plating tank in that it starts with a rapid phase (vertical arrow in Figure 36); continues with a slow phase (Figure 37) to establish electrical contact between the electrode 300 on blank 351 and the bead 103A, in the pre-established, coaxial alignment; and then terminates the slow rise, after a minutely predetermined time delay thereof which establishes electrically adequate, mechanically allowable pressure P between the parts 103A, 300, Figures 38 and 45.

The whisker is then permanently joined with the blank by the soldering operations of Figures 39 and 40. These are initiated manually or automatically; they are indicated and adjusted at 524, 525, 526 (Figure 1). The soldering begins with the passage of regulated electrical current through the heating element 277 of the gripping jaw 252, as indicated by the heat symbols in Figure 39. The bead 103A is thereby caused to melt and to form a mound 103C, fused with the electrode member of the semiconductor 351, Figure 40. The physical and metallurgical processes occurring at this stage of the operation, in various types of transistor production, are known from other disclosures and need not be fully discussed at the present point. It is important, however, to note that the heating, which causes these processes to occur, must be closely controlled. The control can be supervised by suitable instruments 525 in solder control unit 67 (Figure 1), to insure proper melting of the spheroid 103A, while avoiding undesirable side effects. The controlled heating of the bead 103A is desirably rapid. As indicated above with reference to Figure 9, it is preferably obtained by resistance-heating of an electrode on one side of the wire 103 adjacent the bead 103A, and conductive transfer of the heat to said bead, through the wire, thereby avoiding difficulties which would be caused by significant radiant or convective heating or resistive generation of heat in the wire itself. The heating is followed by a cooling and congealing operation, as indicated by the cooling symbols in Figure 40.

As shown in Figures 41 to 43 the operation is finally completed by reversal of the angular gripping action (Figure 41), reversal of the longitudinal gripper action (Figure 42), downward withdrawal of the semiconductor, carrier and carrier fixture (vertical arrow in Figure 43) and ejection of the carrier (horizontal arrow in Figure 43).

By the above-described operations of the present machine, or performance of the method, semiconductor units are produced with great consistency, rapidity and precision, which are for instance of the type shown in Figures 44, 45. While the semiconductor structure as such, as shown in these figures, is known from other disclosures, the following brief remarks are added with respect to the relation of certain features of such a semiconductor to the mechanical operations employed in the present method.

While the semiconductor blank, here identified as 383 and secured to the front portion 135 of the blank support unit 84 by a weld 135A, represents a substantially rigid body, relative to the thin whisker wire 103, the central portion or electrode area 383A of this blank may be of such minute size and of such delicate construction as to require a high degree of caution even in the attachment of a fine whisker or whiskers. This area 383A may for instance have a diameter of about .005 inch and a central thickness of .0001 inch, or less, while the wire 103 may typically have a thickness of about .001 inch, as mentioned, and a length up to a total of about ⅛", which length may be controlled by the feed mechanism 5 with an accuracy of plus or minus .001 inch. Greater accuracies are often required in the vertical motion of the semiconductor. In the positions of Figures 37 to 39, the plated bead 103A must contact one of the electrodes 383E or 383C, shown in Figure 45 in a form somewhat different from that indicated at 300 (Figures 36 to 39) and plated onto the thin base element 383B. The bead 103A must also exert some pressure against this electrode, in an area 103D, in order to prepare suitably for the formation of the ultimate connector 103C. This pressure is exerted in direction of the axis Z. As already indicated, the pressure must be controlled with great care, in order to establish a sufficient electrical and thermal bond, while avoiding excessive mechanical stress. This is achieved by the operation of Figure 37 and associated figures, as explained above.

It will further be seen that the form of the bead 103A is of great importance. This form must be strictly symmetrical, as shown, in order that the generation of an assymmetrical form 103E, 103F of the ultimate connector bead 103C, which would be highly objectionable, may be avoided completely. This is one of the reasons in view of which the above described plating method and operation of Figures 23, 24 and associated figures are of great importance. Additionally, it has been found that the more exact shape of the bead or spheroid 103A has substantial significance for successful and consistent production of acceptable transistor devices and the like. For instance it is important to avoid the formation of such beads which are either too long (by excessive immersion) or too thin (by insufficient plating time or inadequate tank temperature) or too short (by insufficient immersion or, importantly, by the deposition of dust or dirt on the end of the whisker wire, which is most readily avoided by the continuous unrolling and feeding operation and the substantial avoidance of wire transfer steps, as provided herein).

As a final example of the extremely delicate character of the present manipulation, reference may be made once more to that phase of the operation wherein the jaws 251, 252 of the gripping mechanism 82 are opened in order to allow removal of the completed device, Figure 41. It will be seen that if an opening or gap 251A is unilaterally formed in this operation (Figure 45), while the whisker 103 still contacts a surface 252A of one of the jaws, unilateral pressure may be exerted against the whisker, closely above the point 103I in the bead 103C where the axes X, Y, Z intersect, thereby tending for instance to move the whisker end or bead in the direction of axis X. Such minute one-sided pressure has been found to be already sufficient in some cases to damage or destroy the base structure 383B.

While accordingly certain features of the operations of Figures 20 to 43 are of high and even critical importance, these operations as well as the construction of the machine can otherwise be modified in many ways. For instance the operation can be suitably repeated or partly repeated; the described, largely automatic-manual operation can be modified in obvious ways by known interlock means and the like; and the machine may for instance be arranged either to attach first and second whiskers 384, 382 (Figure 15) on the same semiconductor blank, or to attach only one such type of whisker on consecutive semiconductor blanks. According to a still further modification the machine may be used exclusively for the plating of whisker wires, or exclusively for soldering and kindred operations. A great variety of other modifications can evidently be applied. The invention is therefore claimed as follows.

We claim:

1. In a method of substantially permanently attaching whiskers to semi-conductor bodies or the like: placing an end of a whisker in a substantially predetermined position; then preparing said end for attachment to a surface on one of said bodies while holding said end substantially in said position; and thereafter attaching said end to said surface while continuing to hold said end substantially in said position.

2. In apparatus for attaching a thin wire in precisely centered position to a surface on a body of semiconductive material or the like: means for maintaining a small, horizontal work area; means for maintaining a precisely located, vertical pathway passing through said work area; means for downwardly feeding the wire into said work area; means for upwardly guiding the body, with said surface following said pathway, to said work area; means for moving the end of said wire, in said work area, to said vertical pathway; and means for attaching the so-located end of the wire to said body.

3. Apparatus for fabricating electronic devices of the type described comprising means for holding the end of a thin wire in downwardly extending position, in a small, fixed work area; a container for plating and fluxing solution; means for upwardly moving the container into said work area for immersion of the end of said wire in said solution and for subsequent removal of the container from the work area; means for holding a semiconductor in the work area with an electrode upwardly exposed approximately below the end of the wire; means for precisely centering the end of the wire with said electrode and means for attaching the plated end of the wire to the electrode.

4. Apparatus as described in claim 3 characterized by means for first raising the container rapidly toward the wire and then slowly continuing the raising until the wire has been immersed to a predetermined minute extent and for rapidly downwardly withdrawing the container and then slowly completing such withdrawal.

5. Micro-manipulating and soldering apparatus comprising a frame; a support on said frame, adapted to be moved by minor distances in a flat plane; a holder structure mounted on said support and adapted to perform precise movements relative thereto for gripping, holding and then releasing a thin, downwardly extending, flexible article; a reference system on said frame for establishing and maintaining a predetermined datum line across said plane and a datum point on said line; a servo mechanism controlled by the reference system and adapted to move the support and thereby the holder and article to bring the article precisely to said datum point; means mounted on said frame, in registry with said datum point and movable along said line and relative to said article with a body to be soldered to said article; and means for soldernig the body to the article while the article is held by the holder at said datum point.

6. Apparatus as described in claim 5 wherein said support comprises a pair of tables, closely overlying one another and the frame; the holder being mounted on the uppermost table and the servo mechanism comprising a first member for moving the uppermost table in one direction and a second member for moving the underlying and uppermost tables in another direction.

7. Apparatus as described in claim 6 wherein the underlying table has a pair of linkages mounted thereon, each linkage being controlled by one of said members and one linkage engaging the uppermost table while the other engages the frame.

8. Apparatus as described in claim 5 wherein the reference system comprises means for illuminating the article by a plurality of light beams and means for automatically analyzing the illumination of the article provided by each light beam.

9. Apparatus as described in claim 5 wherein the reference system comprises a rigid structure for moving the said body vertically, relative to the article; and means for maintaining a pair of horizontal path ways for the support, intersecting one another at a point indexed with the path for movement of the said body; the mechanism controlled by the reference system being adapted to move the support to the point of intersection.

10. Whisker attaching apparatus for use in the fabrication of semiconductors and the like comprising a whisker holder adapted to hold a whisker in a normally stationary and rigidly maintained position; means for maintaining a pathway rigidly indexed relative to said position, for movement of a body to which the whisker shall be attached; means for performing a controlled rapid motion of said body along said pathway toward said position; means for thereafter performing controlled slow motion of said body along said pathway into contact with the whisker and for establishing a predetermined pressure between the whisker and said body; and soldering means for thereafter soldering the whisker to said body.

11. Apparatus as described in claim 10 wherein the means for rapid motion is also adapted to rapidly withdraw the body together with the whisker from the holder, promptly upon the attachment of the whisker to the body.

12. Apparatus as described in claim 10 wherein the means for slow motion is adapted to move the body in the direction toward the whisker, from a geometrically predetermined point until the whisker contacts the body; the apparatus comprising means for continued slow motion after such contact.

13. Apparatus as described in claim 12 wherein the means for continued slow motion comprises a time delay system.

14. Apparatus as described in claim 13 wherein the soldering means comprises a heater supported by the whisker holder.

15. A machine for attaching whiskers to transistors or the like comprising a rigid frame; means for positioning a transistor or the like, with an electrode thereof exactly centered on a predetermined datum line, said positioning means being adapted to move the transistor or the like along said datum line; an observation system rigidly oriented toward said datum line, said system being mounted on said frame; a servo system controlled by the observation system for movement in directions across said datum line, for establishing coincidence between a whisker end and said datum line; a whisker feeding and holding apparatus controlled by said servo system for providing said whisker end; contacting apparatus for establishing predetermined contact pressure between the whisker end and the electrode of said transistor or the like upon the establishment of said coincidence; and connecting apparatus for connecting the whisker end with the electrode upon such contacting.

16. A machine as described in claim 15, wherein said servo system comprises means adapted to receive electro-optical signals from the observation system and electrical signals from the contacting apparatus; said servo system being arranged and constructed to establish said coincidence between said whisker end and said datum line pursuant to operation of said means for positioning a transistor and prior to operation of said contacting and connecting apparatus.

17. A whisker connecting machine comprising means for positioning a transistor or the like for forward-backward and upward-downward motions; a table structure adjustable diagonally of the forward motion; apparatus mounted on said table structure for feeding whisker wire downwardly toward the positioning means; and apparatus laterally movable on said table structure for gripping, then holding, then severing and finally releasing the wire; and apparatus indexed with said table structure to hold a transistor or the like for connecting the whisker to the transistor or the like.

18. Apparatus as described in claim 17 wherein the apparatus for holding the wire also forms a heat conductive part of the connecting apparatus, the latter apparatus being of the soldering type.

19. A machine as described in claim 17 wherein the whisker feeding apparatus is adapted to feed whisker wire with an accuracy of the order of magnitude of the diameter of the whisker wire itself and wherein the servo system and the contacting apparatus are adapted to move with an accuracy corresponding to a small fraction of said diameter.

20. A machine as described in claim 17 wherein the means for positioning the transistor or the like is adapted to position a member to which a whisker has been attached on one side, for attachment of a whisker on the other side, said means comprising a member adapted to support the previously attached whisker while the new whisker is being attached, and thereafter to leave both attached whiskers exposed.

References Cited in the file of this patent

UNITED STATES PATENTS

| | | |
|---|---|---|
| 2,283,158 | Humphrey | May 12, 1942 |
| 2,354,028 | Kershaw | July 18, 1944 |
| 2,734,119 | Pityo | Feb. 7, 1952 |
| 2,796,512 | Gray | June 16, 1957 |
| 2,813,191 | Gray | Nov. 12, 1957 |